(12) United States Patent
Hopkins et al.

(10) Patent No.: US 10,505,421 B2
(45) Date of Patent: Dec. 10, 2019

(54) ELECTRIC MACHINE STATOR COOLING SYSTEMS AND METHODS

(71) Applicant: Zero E Technologies, LLC, Wheat Ridge, CO (US)

(72) Inventors: Thomas H. Hopkins, Wheat Ridge, CO (US); Felipe J. Castillo, Wheat Ridge, CO (US); Scott T. Graham, Wheat Ridge, CO (US); Keith W. Klontz, Wheat Ridge, CO (US)

(73) Assignee: Zero-E Technologies LLC, Wheat Ridge, CO (US)

( * ) Notice: Subject to any disclaimer, the term of this patent is extended or adjusted under 35 U.S.C. 154(b) by 0 days.

(21) Appl. No.: 16/228,353

(22) Filed: Dec. 20, 2018

(65) Prior Publication Data

US 2019/0123620 A1    Apr. 25, 2019

Related U.S. Application Data

(62) Division of application No. 15/870,472, filed on Jan. 12, 2018, now Pat. No. 10,177,631.

(Continued)

(51) Int. Cl.
   *H02K 1/32*     (2006.01)
   *H02K 9/22*     (2006.01)
   (Continued)

(52) U.S. Cl.
   CPC ............. *H02K 1/32* (2013.01); *H02K 1/04* (2013.01); *H02K 1/12* (2013.01); *H02K 1/148* (2013.01);
   (Continued)

(58) Field of Classification Search
   CPC .. H02K 9/22; H02K 1/32; H02K 9/08; H02K 1/148; H02K 5/15; H02K 3/18;
   (Continued)

(56) References Cited

U.S. PATENT DOCUMENTS

| 1,700,840 A | 2/1929 | Gay |
| 2,039,456 A | 5/1936 | Sammarone |

(Continued)

FOREIGN PATENT DOCUMENTS

| CN | 109660038 A | 4/2019 |
| CN | 109660052 A | 4/2019 |

(Continued)

OTHER PUBLICATIONS

U.S. Appl. No. 15/870,458, filed Jan. 12, 2018; 81 pages.

(Continued)

*Primary Examiner* — Naishadh N Desai
(74) *Attorney, Agent, or Firm* — Adsero IP

(57) ABSTRACT

An electromagnet for an electric machine having a stack of laminations defining a tooth and a yoke segment, and an insulating bobbin surrounding a portion of the tooth of each lamination, such that each lamination is held against adjacent laminations by the bobbin. The disclosed electromagnets also have electrically conductive windings surrounding a portion of the bobbin; and an encapsulant fully encapsulating the bobbin and windings, wherein the encapsulant comprises a dielectric material and an additive to increase the thermal conductivity of the encapsulant.

10 Claims, 16 Drawing Sheets

Related U.S. Application Data

(60) Provisional application No. 62/570,441, filed on Oct. 10, 2017.

(51) Int. Cl.

| | | |
|---|---|---|
| *H02K 3/44* | (2006.01) | |
| *H02K 3/30* | (2006.01) | |
| *H02K 3/32* | (2006.01) | |
| *H02K 1/14* | (2006.01) | |
| *H02K 3/18* | (2006.01) | |
| *H02K 5/15* | (2006.01) | |
| *H02K 1/27* | (2006.01) | |
| *H02K 1/04* | (2006.01) | |
| *H02K 1/18* | (2006.01) | |
| *H02K 1/28* | (2006.01) | |
| *H02K 5/08* | (2006.01) | |
| *H02K 5/18* | (2006.01) | |
| *H02K 7/00* | (2006.01) | |
| *H02K 9/06* | (2006.01) | |
| *H02K 9/08* | (2006.01) | |
| *H02K 9/19* | (2006.01) | |
| *H02K 11/25* | (2016.01) | |
| *H02K 1/12* | (2006.01) | |
| *H02K 5/24* | (2006.01) | |
| *H02K 7/08* | (2006.01) | |
| *H02K 15/10* | (2006.01) | |
| *H02K 15/14* | (2006.01) | |
| *H02K 5/06* | (2006.01) | |

(52) U.S. Cl.
CPC ............... *H02K 1/18* (2013.01); *H02K 1/272* (2013.01); *H02K 1/278* (2013.01); *H02K 1/28* (2013.01); *H02K 3/18* (2013.01); *H02K 3/30* (2013.01); *H02K 3/325* (2013.01); *H02K 3/44* (2013.01); *H02K 5/08* (2013.01); *H02K 5/15* (2013.01); *H02K 5/18* (2013.01); *H02K 5/24* (2013.01); *H02K 7/003* (2013.01); *H02K 7/083* (2013.01); *H02K 9/06* (2013.01); *H02K 9/08* (2013.01); *H02K 9/19* (2013.01); *H02K 9/22* (2013.01); *H02K 11/25* (2016.01); *H02K 15/105* (2013.01); *H02K 15/14* (2013.01); *H02K 5/06* (2013.01); *H02K 2203/12* (2013.01)

(58) Field of Classification Search
CPC .......... H02K 3/325; H02K 1/28; H02K 1/278; H02K 1/18; H02K 1/04; H02K 1/272; H02K 5/08; H02K 5/18; H02K 7/003; H02K 9/06; H02K 3/44; H02K 3/30; H02K 2203/12; H02K 11/25; H02K 9/19; H02K 5/06
See application file for complete search history.

(56) References Cited

U.S. PATENT DOCUMENTS

| | | | |
|---|---|---|---|
| 3,801,843 A | 4/1974 | Corman et al. | |
| 5,796,190 A | 8/1998 | Takeda et al. | |
| 6,118,203 A | 9/2000 | Hansen | |
| 6,528,909 B1 | 3/2003 | Kan et al. | |
| 6,825,585 B1* | 11/2004 | Kalldin | H02K 1/20 310/414 |
| 7,459,817 B2 | 12/2008 | VanLuik et al. | |
| 7,847,449 B2 | 12/2010 | Oberle | |
| 7,960,889 B2* | 6/2011 | Yamamoto | H02K 1/148 310/216.004 |
| 8,310,126 B1 | 11/2012 | Hopkins et al. | |
| 8,456,055 B2* | 6/2013 | Kinoshita | H02K 1/24 310/216.008 |
| 8,519,580 B2 | 8/2013 | Brandl et al. | |
| 8,653,703 B2 | 2/2014 | Kori et al. | |
| 8,674,579 B2* | 3/2014 | Jang | H02K 1/148 310/216.008 |
| 10,177,631 B1 | 1/2019 | Hopkins et al. | |
| 10,256,688 B1 | 4/2019 | Hopkins et al. | |
| 10,256,700 B1 | 4/2019 | Hopkins et al. | |
| 2002/0089253 A1* | 7/2002 | Kudlacik | H02K 55/04 310/260 |
| 2005/0040721 A1 | 2/2005 | Kusase et al. | |
| 2005/0093385 A1 | 5/2005 | Kuhn | |
| 2006/0071568 A1 | 4/2006 | Kimura | |
| 2006/0103256 A1 | 5/2006 | Welke | |
| 2006/0244324 A1 | 11/2006 | Graham et al. | |
| 2007/0273220 A1 | 11/2007 | Koyama et al. | |
| 2008/0042502 A1 | 2/2008 | VanLuik et al. | |
| 2008/0180911 A1 | 7/2008 | Kaneko et al. | |
| 2008/0193275 A1 | 8/2008 | DeFilippis | |
| 2009/0026870 A1 | 1/2009 | Hoshino et al. | |
| 2009/0189489 A1 | 7/2009 | Yura et al. | |
| 2009/0232664 A1 | 9/2009 | Qu et al. | |
| 2010/0301697 A1 | 12/2010 | Takahashi et al. | |
| 2011/0023640 A1* | 2/2011 | Hanson | F16H 57/032 74/421 A |
| 2011/0140550 A1 | 6/2011 | Brandl et al. | |
| 2011/0241350 A1 | 10/2011 | Kori et al. | |
| 2012/0001503 A1 | 1/2012 | Owng et al. | |
| 2012/0104882 A1 | 5/2012 | Pan | |
| 2012/0263612 A1 | 10/2012 | Matsuzaki et al. | |
| 2012/0293034 A1 | 11/2012 | Stabenow et al. | |
| 2013/0043756 A1 | 2/2013 | Bradley | |
| 2013/0074328 A1 | 3/2013 | Malstrom et al. | |
| 2013/0119806 A1 | 5/2013 | Watanabe et al. | |
| 2013/0241329 A1 | 9/2013 | Yagi et al. | |
| 2014/0035428 A1 | 2/2014 | Yuya et al. | |
| 2014/0070634 A1 | 3/2014 | Legros et al. | |
| 2014/0265653 A1* | 9/2014 | Heins | H02K 21/24 310/51 |
| 2014/0306559 A1 | 10/2014 | Stillger | |
| 2014/0368066 A1 | 12/2014 | Ganev et al. | |
| 2015/0035406 A1 | 2/2015 | Huang et al. | |
| 2015/0108872 A1 | 4/2015 | Pinkerton et al. | |
| 2015/0155747 A1 | 6/2015 | Han | |
| 2016/0079814 A1 | 3/2016 | Lacroix et al. | |
| 2016/0118855 A1 | 4/2016 | Maruyama | |
| 2017/0318796 A1 | 11/2017 | Vaisblat et al. | |
| 2019/0229586 A1 | 7/2019 | Hopkins et al. | |
| 2019/0245398 A1 | 8/2019 | Hopkins et al. | |

FOREIGN PATENT DOCUMENTS

| | | |
|---|---|---|
| CN | 109660070 A | 4/2019 |
| EP | 854558 A2 | 7/1998 |
| EP | 2533403 A1 | 12/2012 |
| JP | 55077350 A | 6/1980 |
| WO | WO 2017-121520 A1 | 7/2017 |

OTHER PUBLICATIONS

U.S. Appl. No. 15/870,458; Non-Final Office Action dated Apr. 5, 2018; 24 pages.
U.S. Appl. No. 15/870,458; Final Office Action dated Aug. 9, 2018; 31 pages.
U.S. Appl. No. 15/870,458; Notice of Allowance, dated Dec. 5, 2018, 29 pages.
U.S. Appl. No. 15/870,472, filed Jan. 12, 2018; 81 pages.
U.S. Appl. No. 15/870,472; Office Action-Restriction Requirement; dated Apr. 19, 2018; 10 pages.
U.S. Appl. No. 15/870,472; Non-Final Office Action dated Jun. 11, 2018; 39 pages.
U.S. Appl. No. 15/870,472; Notice of Allowance dated Sep. 27, 2018; 25 pages.
U.S. Appl. No. 15/870,420, filed Jan. 12, 2018; 80 pages.
U.S. Appl. No. 15/870,420; Office Action-Restriction Requirement; dated Mar. 21, 2018; 9 pages.
U.S. Appl. No. 15/870,420; Non-Final Office Action; dated Jun. 6, 2018; 25 pages.

(56) References Cited

OTHER PUBLICATIONS

U.S. Appl. No. 15/870,420; Final Office Action dated; dated Sep. 5, 2018; 29 pages.
Partial International Search Report, PCT/US2018/013622, dated Jul. 11, 2018, 18 pages.
U.S. Appl. No. 16/368,291; NonFinal Office Action, dated Jun. 25, 2019, 46 pages.

\* cited by examiner

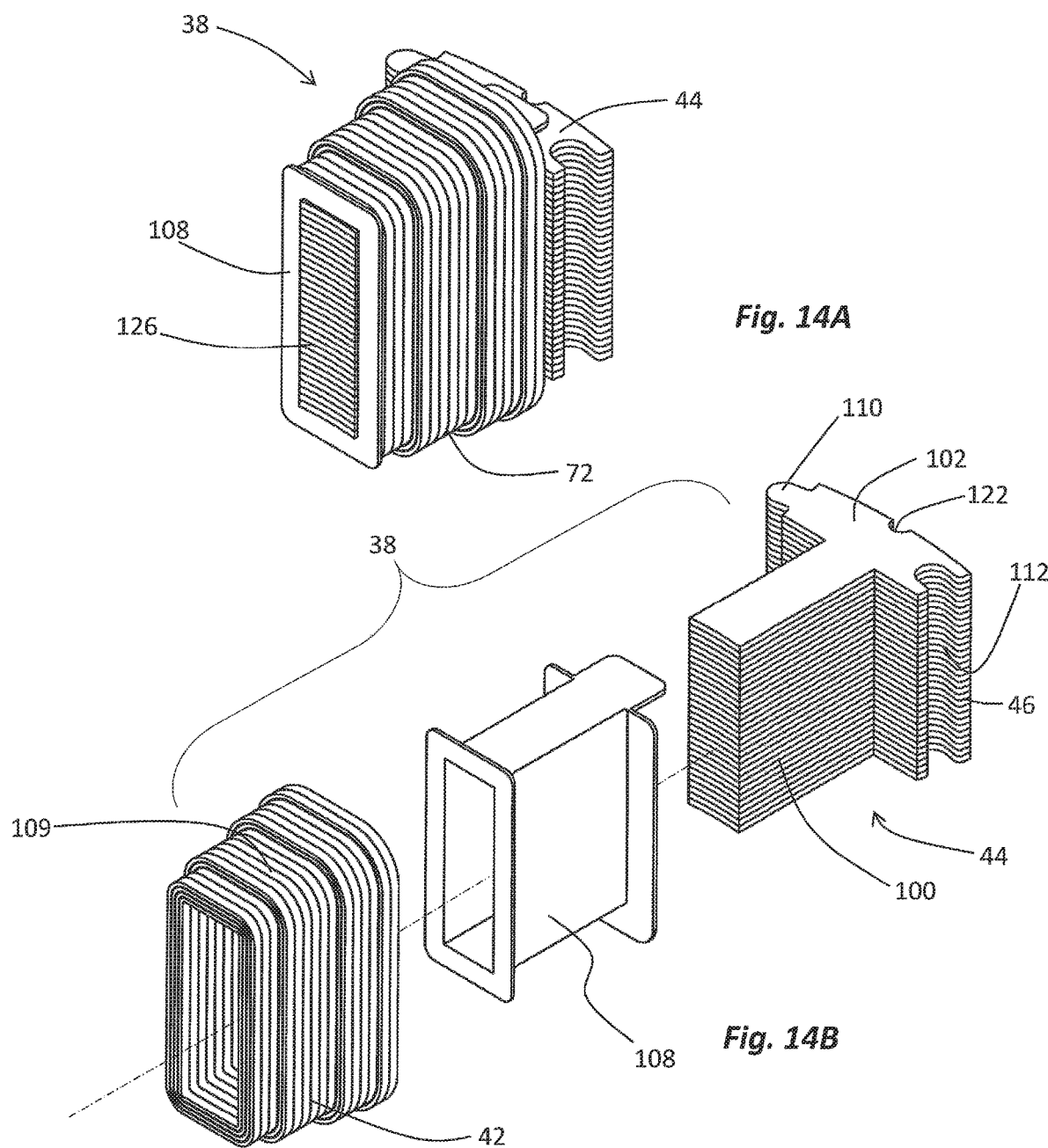

ELECTRIC MACHINE STATOR COOLING SYSTEMS AND METHODS

CROSS-REFERENCES TO RELATED APPLICATIONS

This application is a divisional of U.S. application Ser. No. 15/870,472 filed on Jan. 12, 2018, entitled "Electric Machine Stator Cooling Systems and Methods", which claims priority to U.S. Patent Application Ser. No. 62/570,441, entitled: "Permanent Magnet Motor with Tested Efficiency Beyond Ultra-Premium/IE5 Levels," filed Oct. 10, 2017, the content of which application is incorporated herein in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatus for cooling the stator of an electric machine, for example an electric motor or electric generator. The present disclosure relates more specifically to the cooling of the stator of a permanent magnet (PM) electric machine.

BACKGROUND

Electric machines employed in commercial and industrial applications are often required to operate at 100% of the applicable power rating over what is typically a 60,000-hour service life. Therefore, a motor or other electric machine employed in a commercial or industrial setting must be both reliable and versatile. Machine reliability and lifespan can be compromised by many factors including but not limited to: 1) high temperature operation resulting in thermally induced component failures, 2) vibration, heat, friction, unbalanced operation, contamination, inadequate material selection or other causes of mechanically induced component failure, or 3) dielectric failure resulting in electrical short circuits or open circuits caused by heat, inadequate material selection or other causes.

Electric machines are often provided with a mechanical cooling system, for example a fan plus a cowling configured to direct air over cooling fins cast into the machine housing. Many such devices are classified as totally enclosed fan cooled (TEFC) devices. TEFC motors suffer from inherent inefficiency since a portion of the total power output by the motor must turn the cooling fan, and therefore is unavailable for output. For example, a TEFC motor attached to a conveyor belt must operate both the cooling fan and the conveyor belt, therefore the portion of the motor output required to turn the fan is not available at the conveyor belt. The fan and cowling apparatus of a TEFC machine is prone to damage, and presents a safety risk in a typical industrial setting. Furthermore, since a TEFC machine drives a cooling fan with one side of the motor shaft, it is impossible or difficult to attach two downstream machines to a single TEFC motor.

Conventional electric machines are made robust and durable usually by implementing the machines with large and heavy components. The larger and heavier components required to promote stable long-term operation can increase machine cost and weight.

Other electric machines, having directly ventilated and therefore partially open housings to promote cooling, can suffer from moisture and particulate matter contamination which in turn can cause mechanical component degradation and wire insulation or electric junction degradation and premature failure. Totally enclosed nonventilated (TENV) electric machines present unique cooling challenges since TENV devices lack direct ventilation or an external fan moving air over external cooling fins.

The embodiments disclosed herein are designed to minimize one or more of the above problems.

SUMMARY

Embodiments disclosed herein include electric machine cooling apparatus and methods. Other embodiments include elements imparting enhanced robustness and durability to an electric machine. As used herein, the class of devices referred to as electric machines includes both electric generators and electric motors. Certain embodiments described herein are permanent magnet motors having a radial flux configuration. Many of the disclosed methods and apparatus are also applicable to transfer heat or in part robustness to axial flux machines, transfer flux machines, and linear machines. Certain methods and apparatus may be applicable to non-rotating torque motors, transformers, or inductors. Although many specific embodiments are illustrated with respect to permanent magnet motors, the disclosure and claims are not limited to any specific apparatus configuration and are applicable to any type of electric machine.

Certain embodiments disclosed herein include an electromagnet having a stack of laminations defining a tooth and a yoke segment, and an insulating bobbin surrounding a portion of the tooth of each lamination, such that each lamination is held against adjacent laminations by the bobbin. The disclosed electromagnets also have electrically conductive windings surrounding a portion of the bobbin; and an encapsulant fully encapsulating the bobbin and windings, wherein the encapsulant comprises a dielectric material and an additive to increase the thermal conductivity of the encapsulant.

In some embodiments, the dielectric material comprises a polymer and the additive comprises one or more of boron nitride, silicon carbide, silicon; aluminum powder, copper powder, metal oxide, ceramic, and graphene.

In some embodiments, Individual laminations in the stack of laminations may include opposing first and second planar faces, with one face being in thermal contact with a heat transfer layer. Individual laminations in the stack of laminations may further be in physical contact with a dielectric layer, opposite the heat transfer layer.

Other embodiments include a method of fabricating an electromagnet or stator having a plurality of electromagnets as described above. In some embodiments, each yoke segment defined by a stack of laminations further defines a tongue structure and an opposing groove structure. A plurality of electromagnets may be assembled into a stator by mating the tongue structure and the groove structure of each electromagnet with the corresponding tongue structure and the groove structure of adjacent electromagnets; and encapsulating the assembled stator with a thermally conductive encapsulant.

Certain electric machine embodiments disclosed herein minimize the production of heat caused by eddy currents in the permanent magnets, rotor back assembly, electromagnetic cores, or other structures. In addition, methods and apparatus are disclosed providing for the removal of heat from an electric machine by conduction, convection and radiation utilizing various heat paths through the internal cavities and components or subsystems of the machine.

An embodiment disclosed herein is an electric machine having a rotor, a stator and a housing. The rotor includes a shaft defining a lengthwise axis. The shaft is surrounded by a rotor back assembly, also known as a back-iron assembly. The rotor also includes a radially mounted array of permanent magnets positioned around the perimeter of the rotor back assembly. The machine stator includes a plurality of electromagnets radially positioned around the rotor defining an air gap between an exterior surface of the permanent magnets of the rotor and an interior surface of the electromagnets of the stator.

The rotor and the stator are supported by and enclosed within a housing. In certain embodiments the housing is a totally enclosed nonventilated (TENV) housing. In one embodiment, the stator and the housing define a substantially cylindrical rotor cavity within the air gap and bounded by the housing end plates or similar structures. The rotor cavity may further be divided into first and second cavities when the rotor is positioned within the rotor cavity. Specifically, a first cavity exists between the rotor and the housing at one end of the rotor, adjacent to a housing end plate. A second cavity exist between the rotor and housing at the other end of the rotor, adjacent the other end plate. The housing end plates may be separate plates attached to a housing perimeter portion, alternatively one of the end plates and the housing perimeter may be a cast, machined or otherwise unitary or co-formed housing element.

The first and second cavities are connected through the air gap. In addition, one or more ventilation channels can be provided through the rotor back assembly, extending from the first cavity to the second cavity. The first and second cavities, the air gap, and the ventilation channels therefore define a fluid circuit around the exterior of and through the back-iron of the rotor. The rotor may also include an internal fan extending into the first or second cavity. The internal fan is part of the rotor or connected to the rotor and is configured to cause low pressure at either the air gap or the ventilation channels and high pressure at the other of the air gap and ventilation channels. Therefore, when the rotor rotates, air or another fluid, for example an air and oil mixture, is caused to circulate around the fluid circuit from one cavity through the air gap to the other cavity and back to the original cavity through the ventilation channels. Thus, heat generated in the rotor during operation can be transferred to the air or other fluid flowing in the fluid circuit to cool the rotor.

The rotor fan can be a separate structure, or could be rotor fan blades formed in an exterior surface of the rotor back assembly. In addition, the rotor back assembly, fan blades, or fan may be treated to enhance the radiation of heat to the fluid circuit and therefore to the first cavity or the second cavity. Suitable surface treatments include but are not limited to surface roughening, or surface anodization.

Heat is produced during the operation of an electric machine within the rotor primarily by magnetically induced eddy currents in the permanent magnets and magnetically induced eddy currents and hysteresis within the rotor back assembly. In certain embodiments, the production of heat within the rotor can be reduced by implementing both the permanent magnets and the rotor back assembly with a series of laminations. Structural support and advantageous heat transfer characteristics may be provided by binding the permanent magnets to the rotor back assembly with a retainer band surrounding an outer surface of the magnets, facing the air gap.

Heat transfer from the rotor to the fluid circuit and subsequent heat transfer from the first and second cavities to the machine housing may be facilitated with various heat transfer structures. One class of heat transfer structures is mounted to the rotor facing either the first cavity or the second cavity. Another class of heat transfer structures may be mounted to the housing, typically at the end plates, facing into the first cavity and/or the second cavity. Any one of these heat transfer structures may include an array of pins, fins, combination pin/fins, or other structures to increase surface area and turbulence, and therefore promote effective heat transfer to or from the attached rotor or housing structure. In addition, a heat transfer structure may be fabricated from a material such as aluminum or copper having relatively high thermal conductivity. A heat transfer structure may be textured, colored, have a surface treatment, or otherwise fabricated to effectively transfer heat to or from the fluid circuit.

Additional heat may be transferred away from the permanent magnets by including a thermally conductive filler or encapsulant material in the gap between adjacent permanent magnets. The thermally conductive encapsulant material may be a polymer such as an epoxy having an additive suspended within the polymer matrix to increase the thermal conductivity of the rotor encapsulant above the native thermal conductivity of the polymer, epoxy or other rotor encapsulant material. The thermally conductive encapsulant serves to conduct heat away from the sides of the permanent magnets toward the first and second cavities during rotor operation. Any heat transfer structures attached to the rotor can be placed into thermal contact with the thermally conductive encapsulant regions to promote heat exchange with the fluid circuit.

A thermally conductive encapsulant in the gap between adjacent permanent magnets also provides structural rigidity and robustness to the rotor. The encapsulant serves to additionally secure the permanent magnets to the rotor back assembly and prevent the magnets from slipping around the circumference of the rotor under load. In some embodiments, the rotor back assembly may define an anchoring surface between adjacent permanent magnets serving to more securely anchor the encapsulant to rotor back assembly. An anchoring surface may be a groove, protrusion, keyway or the like formed in her extending from the rotor back assembly.

A portion of the heat generated in the permanent magnets or rotor back assembly may be conducted to the shaft and conducted from the shaft to equipment driving or being driven by the electric machine. A machine shaft is typically fabricated from steel or another high-strength alloy that may not have relatively high thermal conductivity. The thermal conductivity of a machine shaft may be enhanced by providing the shaft with a thermally conductive shaft core made of a material, copper for example, having a different composition, and higher thermal conductivity than other portions of the shaft.

In certain embodiments heat may be transferred to the shaft from the housing as well. The shaft is typically supported by bearings at each end of the rotor. The bearings are supported by the housing. In some embodiments portions of the bearing structure, the bearing seals for example, may be fabricated from a material having enhanced thermal conductivity such as copper. Bearing flanges or other housing elements supporting the bearings may also be fabricated from a material having enhanced thermal conductivity. In such embodiments, the thermally conductive shaft core may be made to extend toward the shaft perimeter where the shaft and bearings are in contact.

It may be advantageous in certain embodiments to seal the housing. For example, a TENV motor may be sealed to prevent internal contamination. In such an embodiment the bearings may be accessible from outside the housing to facilitate bearing removal or replacement without requiring the housing to be opened.

Electric machine embodiments also include a stator having a plurality of radially positioned electromagnets. In some embodiments, the stator is encapsulated such that the stator encapsulant is in thermal contact with housing structures, for example the housing end plates. In some embodiments the entire perimeter portion of the housing is in thermal contact with the stator or the stator encapsulant. In an embodiment, the housing includes a perimeter portion, a first end plate at the second end plate. The end plates may be separate structures or co-fabricated with the perimeter portion of the housing. The stator encapsulant may contact the first end plate and the second end plate such that a central region of the first end plate, a central region of the second end plate, and an interior stator surface define the enclosed cylindrical rotor cavity. In some embodiments, substantially no voids will extend from the interior stator surface, the central region of the first end plate, and the central region of the second end plate toward the perimeter portion.

The stator encapsulant provides for device robustness and thermal transfer from the stator to the housing. The thermal conductivity of the encapsulant may be enhanced by mixing an additive to the encapsulant to increase the thermal conductivity of the encapsulant. For example, the encapsulant may be a dielectric material such as a polymer or epoxy and the additive may be boron nitride, silicon carbide, silicon, aluminum oxide, aluminum powder, copper powder, metal oxide, ceramic, graphene, substantially spherical particles or combinations of these or similar materials.

Thermal transfer between the stator and the housing and overall machine robustness may be enhanced by fitting the stator closely to the perimeter portion of the housing. Thermal transfer between the stator and the perimeter portion of the housing may be further enhanced by filling any gap between the stator perimeter and housing with a thermally conductive lubricant or encapsulant.

Thermal transfer from the rotor cavity defined by the stator and housing may be facilitated by providing one or more heat transfer structures in thermal contact with the central regions of the housing or an end plate. The heat transfer structures may include pins, fins, combination pin/fins or other structures extending into the rotor cavity to increase surface area, air turbulence, or otherwise promote heat transfer from the rotor cavity. In addition, any heat transfer structure may be colored, anodized, or have a surface treatment designed to promote effective heat transfer.

Thermal energy transferred to the housing may be removed from the electric machine by conduction, convection or radiation. Heat transfer from the housing may be enhanced by providing the housing with fins, external heat transfer structures, black anodization or other means. In addition, the housing may include feet fabricated from a material having high thermal conductivity, aluminum for example. Heat may be transferred from the feet to a mounting surface, for example a factory floor, shelf, or other equipment. Heat transfer from the feet to the mounting surface may be facilitated by providing an interface having high thermal conductivity between the feet and the mounting surface, for example thermal paste or copper.

Stator embodiments include a radial array of electromagnets. In certain embodiments, each electromagnet includes a core having a stack of laminations defining a tooth portion and a yoke segment. An insulating bobbin may be provided surrounding a portion of the tooth of each lamination. Electrically conductive windings then surround a portion of the bobbin. In one embodiment, each lamination in the stack of laminations is held against adjacent laminations solely by pressure from the bobbin, without the use of screws, welds, pins, crimp joints, glue or other fastening means.

In some embodiments, heat transfer from an electromagnetic core may be enhanced by providing a heat transfer layer in thermal contact with one or both of the planar faces defined by a core lamination. The heat transfer layer may be any material having a higher thermal conductivity than the magnet steel used to fabricate the laminations. Representative heat transfer materials include, but are not limited to, metals such as copper, nickel, silver or materials such as graphene. The heat transfer material must be in thermal contact with the associated lamination, meaning that heat from the lamination may transfer directly to the heat transfer material. Thermal contact may be physical contact. Alternatively, thermal contact may occur through an intermediate material such as a thermal paste. In some instances, the heat transfer material may be deposited on, plated onto, coated onto or otherwise permanently bonded to the lamination.

Electromagnetic cores will also typically include a dielectric layer between laminations. In one embodiment, laminations will have a dielectric layer applied or in contact with one planar face and a heat transfer layer in thermal contact with the opposing planar face. In this embodiment the interface between adjacent laminations will include a dielectric layer from one lamination and a heat transfer layer from the other lamination.

The arc-shaped yoke segment defined by a stack of laminations may in certain embodiments define a tongue structure and an opposing groove structure configured to mate with each other. Thus, a stator may be assembled from a plurality of electromagnets by engaging the tongue structure of the first electromagnet with the groove structure of an adjacent electromagnet and so on until the stator is completed. In certain embodiments, the yoke segments of a plurality of electromagnets is directly supported by a shoulder structure extending from the housing or a housing end plate providing machine robustness and a direct thermal pathway from the stator to the housing.

Alternative embodiments include methods of cooling an electric machine rotor, methods of cooling an electric machine stator, methods of cooling an electric machine, methods of fabricating an electric machine, methods of stabilizing an electric machine, and methods of fabricating an electromagnet for an electric machine.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIG. 14A is an isometric view of an electromagnet structure.

FIG. 14B is an exploded isometric view of the electromagnet structure of FIG. 14A.

DETAILED DESCRIPTION OF CERTAIN EMBODIMENTS

Overview

Figure 1:
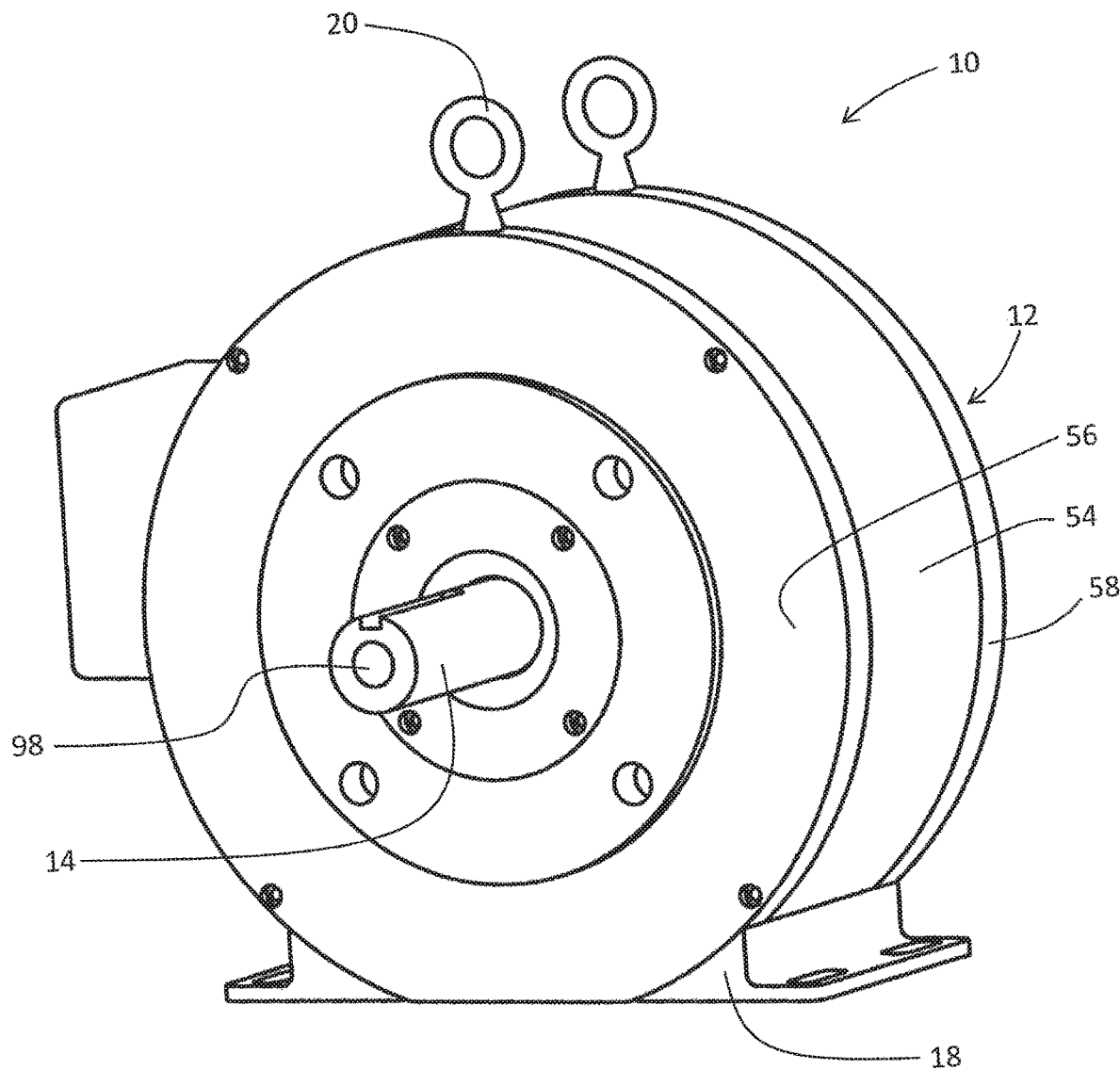
FIG. 1 is an isometric view of a representative electric machine; a totally enclosed nonventilated (TENV) permanent magnet (PM) motor.

Certain embodiments disclosed herein are electric machines engineered to provide relatively maintenance-free, robust, long-term, and efficient service in commercial, transportation, or industrial settings. As used herein, the class of devices referred to as "electric machines" includes both electric generators and electric motors. Certain embodiments described herein are permanent magnet motors having a radial flux configuration. Many of the disclosed methods and apparatus are also applicable to improve the overall robustness and thermal performance of axial flux machines, transfer flux machines, and linear machines. Certain methods may be applicable to the thermal management or stability of non-rotating torque motors, transformers, or inductors. Although many specific embodiments are illustrated herein with respect to totally enclosed nonventilated (TENV) permanent magnet motors, the disclosure and claims are not limited to any specific apparatus configuration and are applicable to any type of electric machine.

Electric machines generate heat during operation. Heat, if not dissipated properly, can reduce the life of the machine significantly. Sustained operation at high temperatures can impact the physical properties of many machine components, including but not limited to electrical insulation, electrical contacts, encapsulation materials, magnets and so forth. Excess heat can make these components soft when first hot and then gradually brittle, impacting device performance and leading to premature failure. Accordingly, two keys to designing a robust electric machine are reducing the generation of heat during machine operation, and increasing heat dissipation from the machine. Many of the methods and apparatus described herein provide for one or both of reduced heat production and effective heat dissipation from a machine during operation. The disclosed techniques and structures are collectively referred to as thermal management methods or thermal management apparatus.

Some methods and apparatus providing for advantageous thermal management also generally enhance the mechanical stability of a machine, and therefore provide additional machine robustness and durability. Other methods and apparatus described herein enhance machine stability and robustness without affecting thermal properties.

Certain TENV machines disclosed herein feature an overall device configuration designed to enhance thermal management and machine robustness. For example, a representative TENV machine, the permanent magnet motor 10 of FIG. 1, may have a pancake shape, with concentrated electromagnet windings, maximized slot fill, surface mounted and oversized permanent magnets and other apparatus to enhance thermal management and provide overall machine robustness as detailed herein. Specific embodiments of the disclosed permanent-magnet TENV motor 10 use less than half the copper and less than half the electric steel compared to an induction motor of the same power rating.

In addition, several disclosed embodiments utilize aggressive, but passive cooling. Multiple heat paths are designed into the machines to provide for heat transfer from interior structures to the external housing where heat may be dissipated by natural convection into the surrounding air, by radiation to surrounding objects, by conduction into machine mounting surfaces, and/or by conduction through the drive shaft into a driven device (for example a fan, pump, conveyor belt, wheels, or other apparatus).

Figure 2:
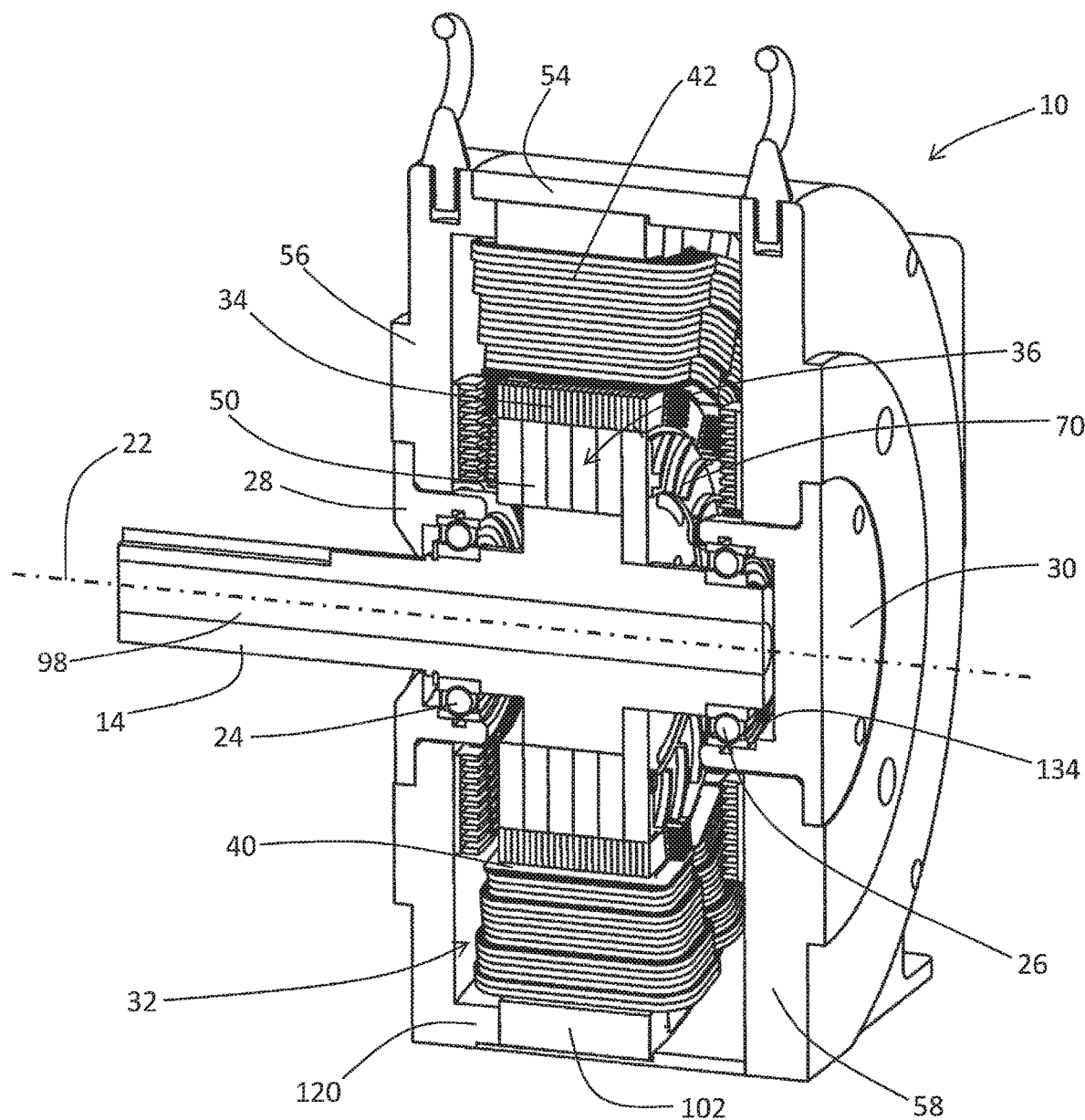
FIG. 2 is an isometric cross-sectional view of the motor of FIG. 1.

FIG. 1 is an isometric external view of a representative electric machine, permanent-magnet TENV motor 10. FIG. 2 is an isometric cross section view of the motor 10 showing certain internal elements. The motor 10 includes a housing 12, surrounding and supporting internal components and a shaft 14 connected to a rotor 16. The housing 12 may be connected to or include various supporting structures, which can be supplied or varied according to need. For example, the housing may be connected to feet 18, lifting eyebolts 20, a C-face, a flange-face, or other supporting or attachment structures facilitating the placement and mounting of the motor 10 into an operational setting.

As shown in FIG. 2, the shaft 14 is connected to the rotor 16 such that the shaft 14 defines a lengthwise shaft axis 22 around which the shaft 14 and rotor 16 rotate when the motor 10 is operated. Alternatively, external torque applied to the shaft 14 can cause the rotor to rotate around the shaft axis 22 if the electric machine is a generator. The shaft 14 and rotor 16 are supported by bearings 24 and 26 seated in bearing flanges 28 and 30. The embodiment illustrated in FIGS. 1 and 2 features a shaft 14 extending through the housing 12 from only one side of the rotor 16. Alternative embodiments may include a shaft 14 extending through the housing 12 from both sides of the rotor 16. Such an alternative embodiment, which is not feasible with a TEFC machine because of the cooling fan, can advantageously drive two downstream machines at once, with one downstream machine being attached to each end of the shaft 14. In embodiments featuring a shaft 14 extending from one side of the rotor 16 only, the opposing ends of the motor 10 may be referred to as the shaft end "SE" and opposite shaft and "OSE" for convenience. Thus, elements such as bearings 24 and flange 28 may be referred to herein as the SE bearings 24 and the SE bearing flange 28 respectively. It is important to note however, that this disclosure expressly covers electric machines having shafts 14 extending from one side of the housing 12, both sides of the housing 12, or not extending from the housing 12 at all.

The rotor 16 is substantially surrounded by a stator 32. As described in detail herein, the rotor 16 includes a series of permanent magnets 34 arranged around, but spaced away from the shaft axis 22. The permanent magnets 34 are supported by a rotor back assembly 36 sometimes referred to as a back-iron assembly because this assembly is typically constructed of a magnetic material such as steel or another type of steel/iron alloy. The rotor back assembly 36 is mechanically bonded to the shaft 14 or co-fabricated with the shaft.

The stator 32 includes a series of electromagnets 38 surrounding the rotor 16 such that the electromagnets 38 and permanent magnets 34 are separated from each other by an air gap 40. In highly simplified terms, motor operation occurs when alternating current is applied to the windings 42 of the electromagnets 38, causing a varying magnetic field to be formed by the stator 32. Magnetic attraction between the permanent magnets 34 and the electromagnets 38, within the varying magnetic field, causes the rotor 16 to rotate with respect to the stator 32. Thus, torque may be transferred to any device(s) attached to the shaft 14 as is typical with motors. In an alternative generator configuration, the shaft 14 may be rotated by an external source of torque, causing the permanent magnets 34 to form a varying magnetic field. The varying magnetic field can then induce alternating current in the windings 42, thereby generating electricity.

Heat Generation in Electric Machines

When the motor 10 or other electric machine is operated, heat is created in both the rotor 16 and stator 32. The principal sources of heat generated in the rotor 16 are eddy current losses in the permanent magnets 34 and eddy current losses or hysteresis losses in the rotor back assembly 36. The principal source of heat generated in the stator 32 include resistance in the windings 42 and eddy current/hysteresis losses in the associate electromagnet cores 44. Furthermore, drag, also described as windage, is created as the rotor 16 rotates within the motor 10. Windage generates additional heat. Friction at the surfaces of bearings 24 and 26 also creates heat inside the housing 12. As noted above, a certain class of electric machine is described as a totally enclosed and nonventilated "TENV" machine or motor. A TENV motor provides certain advantages, including but not limited to reduced maintenance requirements, since the internal motor elements are substantially sealed against external contamination. Heat generated within a sealed TENV machine must be dissipated however, without an external fan circulating air over the housing and without direct ventilation openings to avoid premature component failure.

The disclosed apparatus and methods of facilitating thermal management in an electric machine, and therefore promoting general machine robustness, can be classified as either (a) methods and structures for minimizing the production of heat, or (b) methods and structures facilitating machine cooling after heat has been produced. Several thermal management techniques described herein involve the export of heat through the rotor 16, stator 32 and/or housing 12. Several alternative thermal management strategies are described herein. The various methods and apparatus may be combined with one another in any fashion, scaled, or partially implemented as necessary to achieve specific heat mitigation goals.

Electric Machine Rotor Structure

As noted above, the production of heat during the operation of an electric machine is inevitable but can, in certain instances be reduced. The primary sources of heat generation in the rotor 16 are magnetically induced eddy currents within the permanent magnets 34 and magnetically induced eddy currents or hysteresis losses within the rotor back assembly 36. The scale of each type of magnetic eddy current and the resulting heat production may be reduced by implementing the permanent magnets 34 and rotor back assembly 36 as laminated structures.

Figure 3:
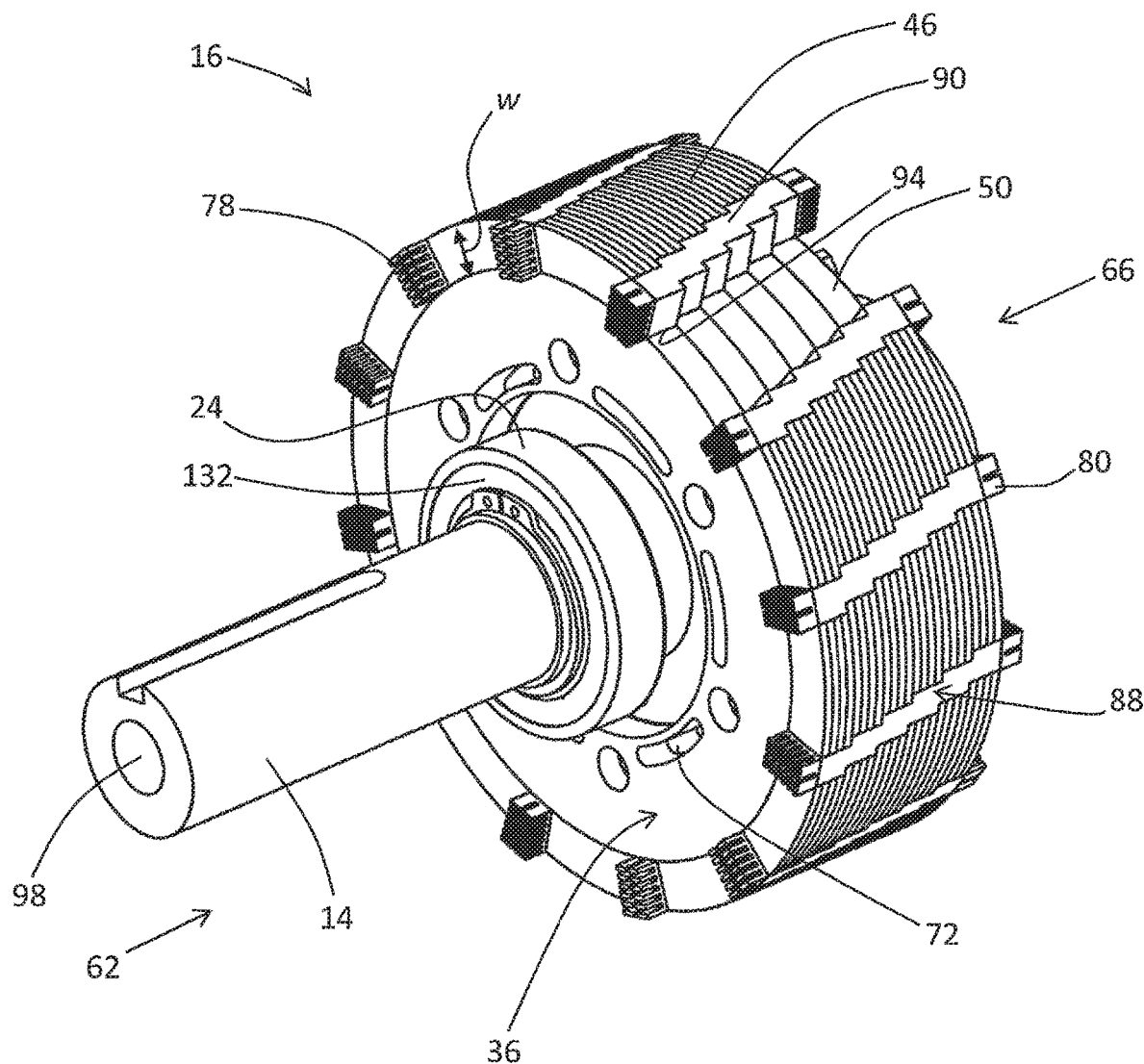
FIG. 3 is an isometric shaft end (SE) view of a rotor showing permanent magnets and other structures.
Figure 4:
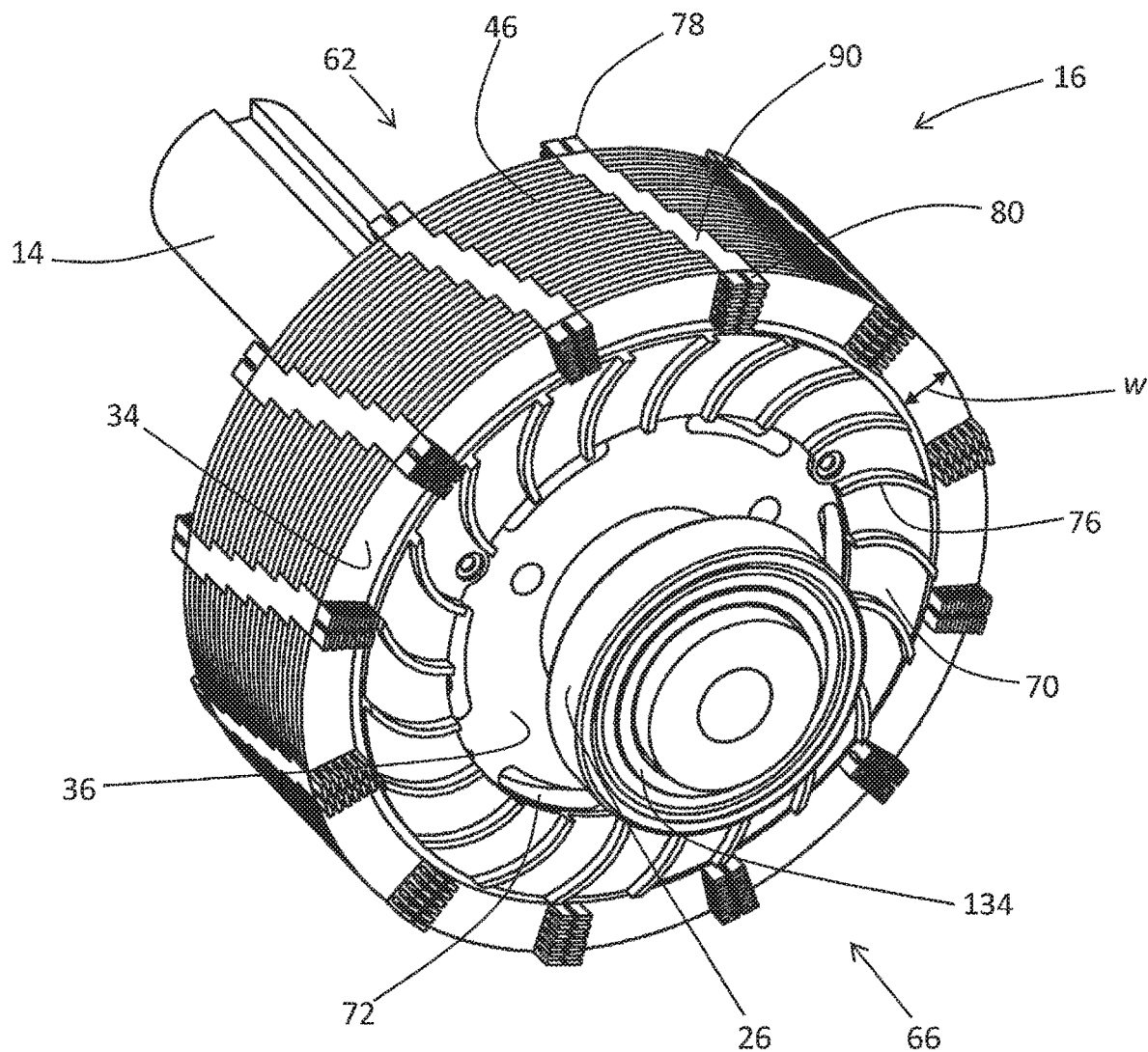
FIG. 4 is an isometric opposite shaft end (OSE) view of the rotor of FIG. 3.
Figure 5:
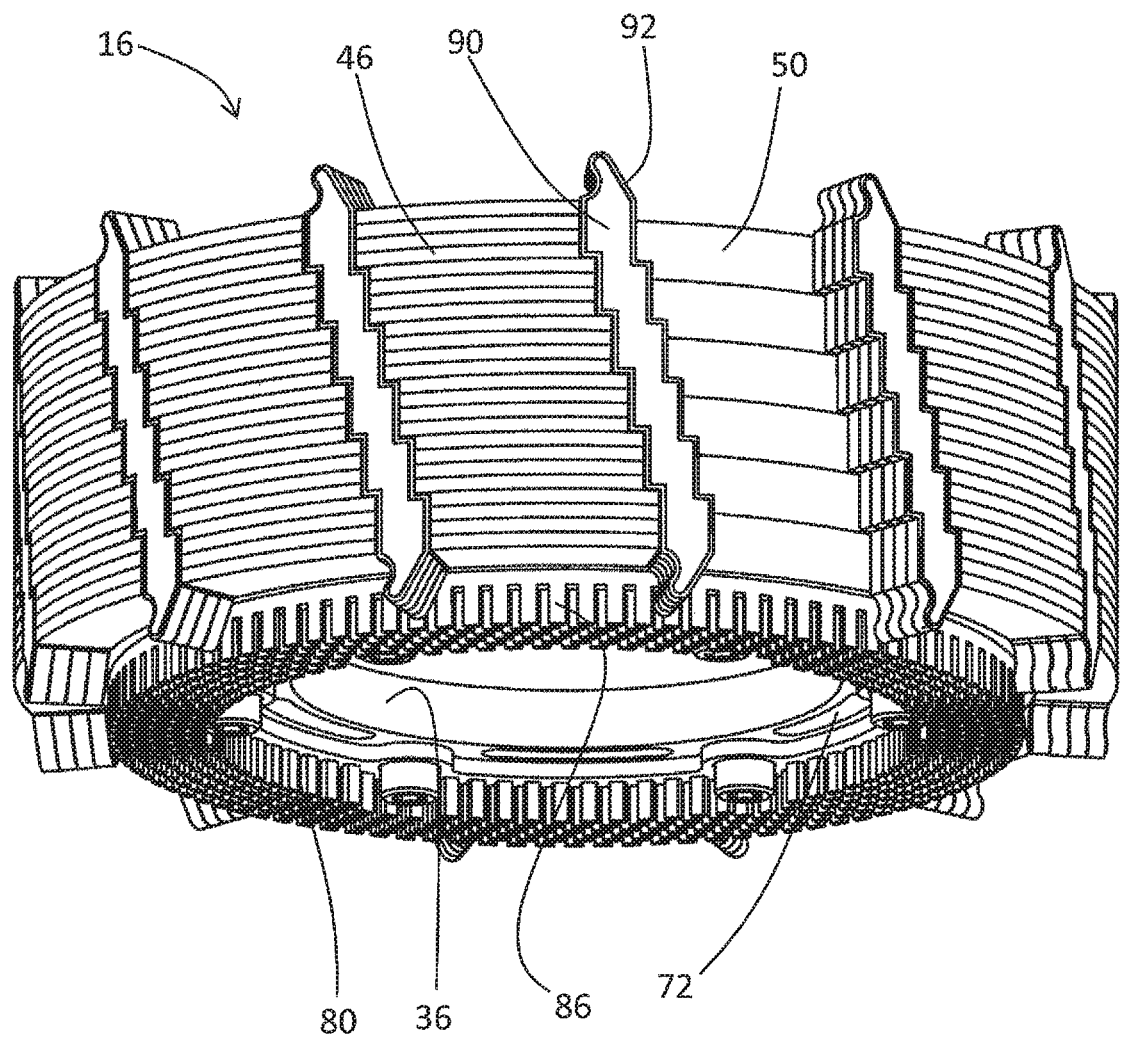
FIG. 5. is an isometric opposite shaft end (OSE) view of an alternative rotor embodiment.

For example, FIGS. 3-5 are isometric views of two alternative embodiments of a rotor 16. The first embodiment of rotor 16, shown in FIGS. 3 and 4, is the rotor 16 from FIG. 2. This rotor 16 features a shaft 14 extending from only one side. Alternative embodiments include a shaft 14 extending from both sides of the rotor 16. The FIG. 3-4 rotor embodiment is shown in a SE isometric view in FIG. 3 and an OSE isometric view in FIG. 4. The alternative rotor 16 of FIG. 5 could be implemented with a single or dual shaft configuration. Each rotor 16 features a rotor back assembly 36 mechanically bonded around a portion of the shaft 14. Permanent magnets 34 are mounted around a perimeter of, and in contact with the rotor back 36 such that the permanent magnets 34 are radially arranged around, but spaced away from, the shaft 14.

A permanent magnet 34 may be fabricated from any number of laminations 44. Laminations 44 are fabricated from the permanent magnet material, which may be a rare-earth magnet material, for example a neodymium-iron-boron magnet material, a samarium-cobalt magnet material, Alnico magnets, and the like, or a conventional magnet material such as a ferrite ceramic. In one representative embodiment, the permanent magnets 34 of rotor 16, as illustrated in FIG. 5, have twenty-four (24) laminations 46. Each lamination 46 is a relatively thin, planar section of permanent magnet material with multiple laminations being stacked one on top of the other such that the plane defined by the interface between adjacent laminations is generally perpendicular to the shaft axis 22. Alternative embodiments of permanent magnet 34 may include any number of laminations 46, for example a permanent magnet 34 may include 2, 4, 8, 12, 16, 20, 24, 28, 32, 36, 40 or more laminations 46 to reduce the scale of magnetically induced eddy currents and heat production. Each lamination 46 within a permanent magnet 34 may optionally be separated from adjacent laminations 46 by an insulator, such as a lacquer, varnish, paper, or other relatively thin insulating material.

Relatively high-performance rare-earth magnet materials may be selected for the permanent magnets 34 of the rotor 16. Rare-earth magnets have higher remanence, much higher coercivity and energy product than other permanent magnet types. Thus, machine efficiency can be enhanced with rare-earth permanent magnets 34, although steps must be taken to promote overall machine robustness and stability if rare-earth permanent magnets 34 are utilized.

Specifically, rare-earth magnets can be demagnetized if they become too hot, and the magnetic properties of rare earth magnets will not recover when the magnets cool down. Therefore, rare-earth magnets 34 must be selected with a higher temperature rating than the maximum temperature anticipated in the permanent magnets 34 during thermally stable operation at the highest rated power output. For example, if the expected high temperature of the permanent magnets 34, according to a selected design, is 130° C., then it is advisable to utilize rare-earth magnets 34 that are temperature rated to at least a 35% higher, temperature (according to UH grade), for example a up to 180° C., to provide operational headroom.

Rare-earth permanent magnets can also be demagnetized by excessive flux generated by large currents in the stator windings 42. Therefore, selected embodiments of motor 10 utilize permanent magnets 34 with geometries that create a large permeance coefficient to increase resistance to flux-based demagnetization. For example, as shown in FIGS. 3 and 4, motor 10 may include a rotor 12 having rare-earth permanent magnets 34 with a radial thickness dimension w, measured along a radius line extending outward from the shaft axis that is eight (8) times or greater than the width of the magnetic air gap 40 measured along the same radius line. The use of rare-earth permanent magnets 34 having a high permeance coefficient allows the motor to operate in conditions far beyond nominal ratings without threat of demagnetization. Some of these conditions could include operation at peak torque, operation at extended speed ranges utilizing field weakening, or a combination of both.

The rotor back assembly 36 may also be assembled from multiple laminations of steel, iron, another iron alloy, or another suitable rotor back assembly material. In one representative embodiment, shown in FIG. 5, the rotor back assembly 36 includes six (6) laminations 50. Each lamination 50 is a relatively thin, flat, annular section of rotor back material. Multiple laminations are stacked one on top of the other with the plane defined by the interface between adjacent laminations 50 being generally perpendicular to the shaft axis 22. Alternative embodiments of rotor back assembly 36 may include any number of laminations 50, for example, the rotor back 36 may include 2, 4, 8, 12, 16, 20, 24, 28, 32, 36, 40 or more laminations 50 to minimize the scale of magnetic eddy currents, hysteresis loss, and heat production within the rotor back assembly 36. Each lamination 50 of the rotor back assembly 36 may optionally be separated from adjacent laminations 50 by an insulator, such as a lacquer, varnish, paper or other relatively thin insulating material.

Figure 6:
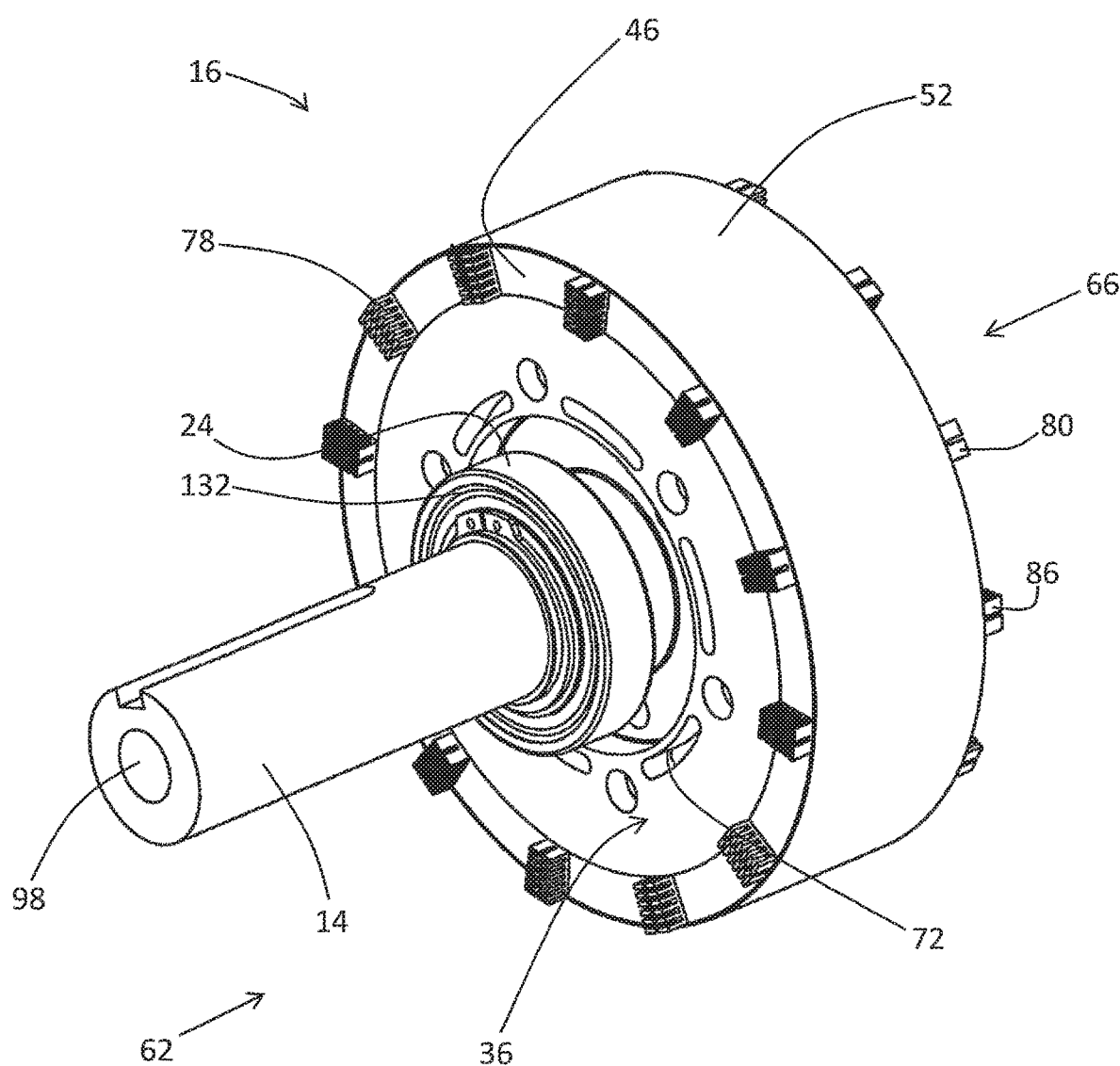
FIG. 6 is an isometric SE view of the rotor of FIG. 3 showing a retainer band around the rotor structure.
Figure 7:
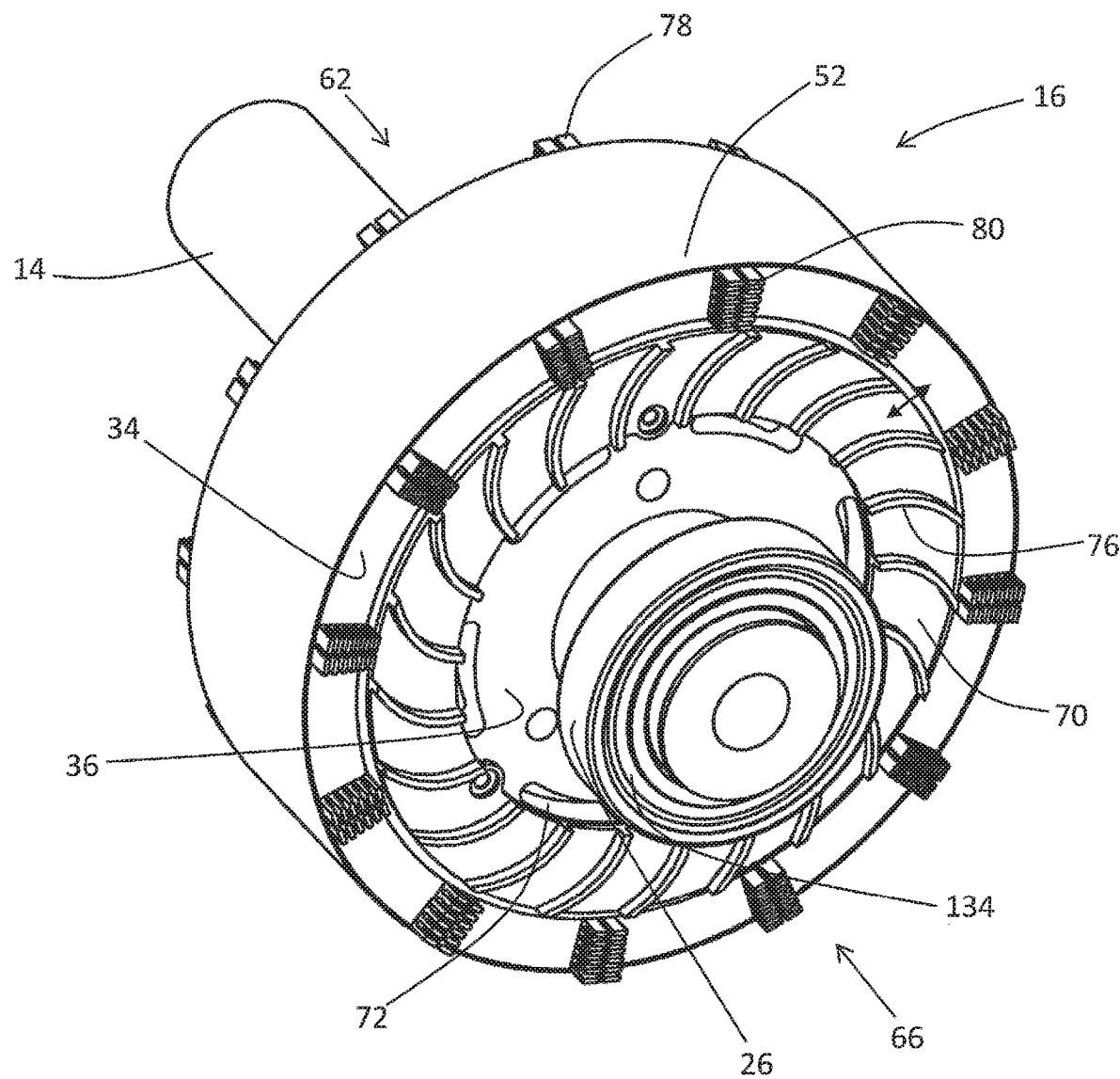
FIG. 7 is an isometric OSE view of the rotor of FIG. 6.

During operation, the rotor 16 rotates at a high rate of speed and is subject to varying magnetic flux. Therefore, it is important to assure that the permanent magnets 34 are securely bonded to the rotor back assembly 36. An adhesive may optionally be used to bond the permanent magnets to the rotor back assembly 36. In certain embodiments, as illustrated in FIGS. 6 and 7, the rotor 16 includes a retainer band 52 around the perimeter of the rotor 16 facing the air gap 40 and stator 32. The retainer band 52 can be prestressed to secure the permanent magnets 34 and adjacent structures during operation. In addition, the retainer band 52 may be specifically configured to minimize drag as the rotor 16 rotates, and thereby minimize windage heat production.

In certain embodiments, the retainer band 52 is fabricated from a magnetic material such as steel or a graphene composite. In such embodiments, the banding may be implemented from a plurality of separated bands to minimize the generation of eddy currents in the band 52. In addition, the banding may be impregnated with a heat transfer material or otherwise treated to facilitate heat transfer from the permanent magnets 34 to the outside surfaces of the band 52 and air gap 40. Alternatively, the retainer band 52 may be fabricated entirely from a material selected to have enhanced heat transfer properties, for example copper or aluminum. Alternatively, the band 52 may be fabricated entirely from a carbon fiber mat or carbon fiber filament that can be prestressed, does not generate eddy currents, and also has relatively high thermal conduction properties.

Rotor Cooling Methods and Apparatus

Heat production in an operating electric machine rotor can be reduced using the techniques described above, but some heat production is inevitable. Therefore, several apparatus and methods are disclosed herein for cooling an electric machine rotor. It is important to note that the rotor 16, particularly in a TENV machine such as the motor 10, is substantially or entirely enclosed within the machine housing 12 and surrounded by the stator 32. Therefore, cooling a rotor 12 often involves heat transfer to another motor structure prior to heat export from the motor 10. In certain instances, the rotor cooling methods and apparatus described herein operate in conjunction with methods and apparatus for cooling other portions of the motor 10, stator 32 and/or housing 12.

A. Rotor Forced Fluid Circuit

Figure 8:
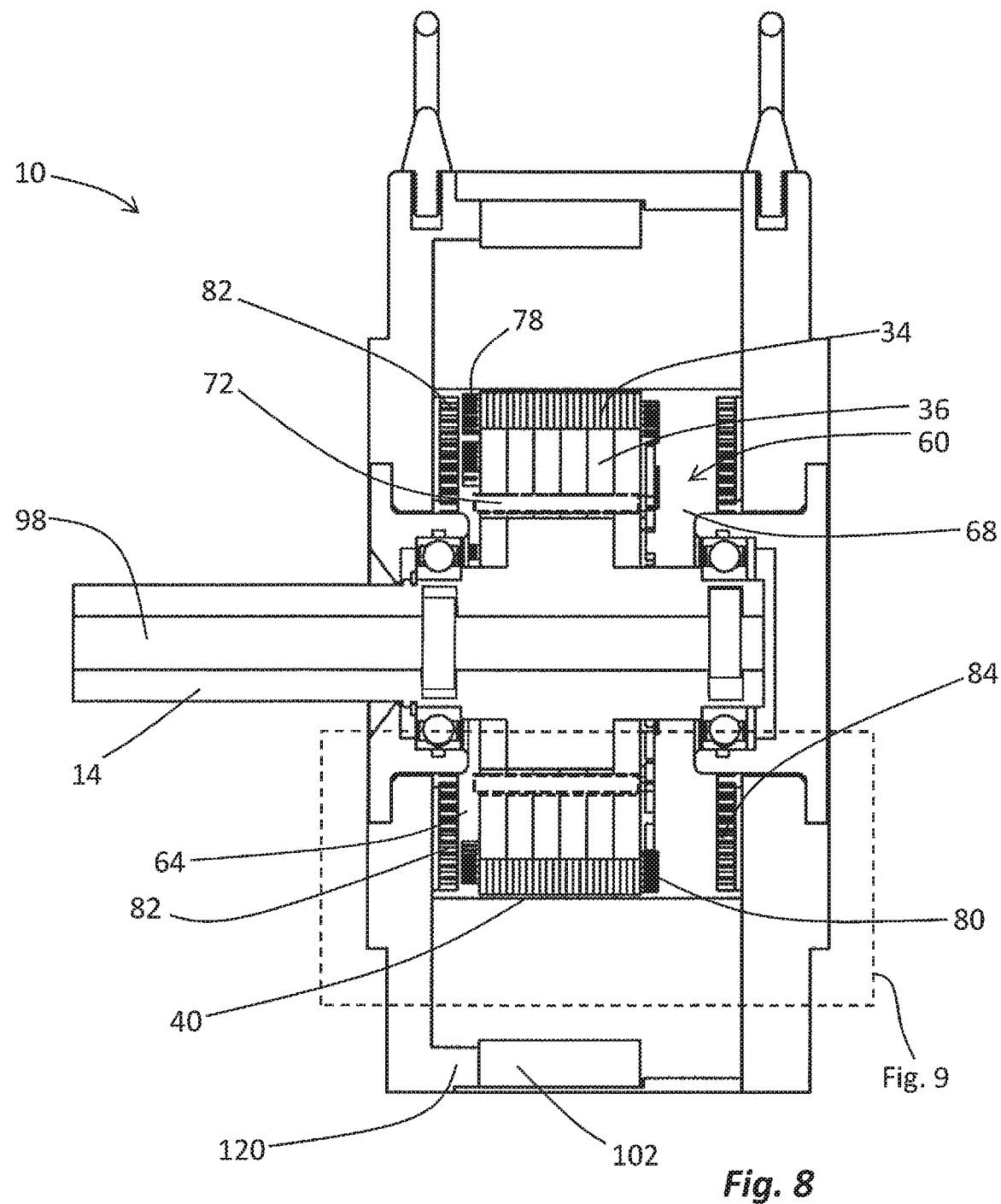
FIG. 8 is a side elevation cross-sectional view of the motor of FIG. 1.
Figure 9:
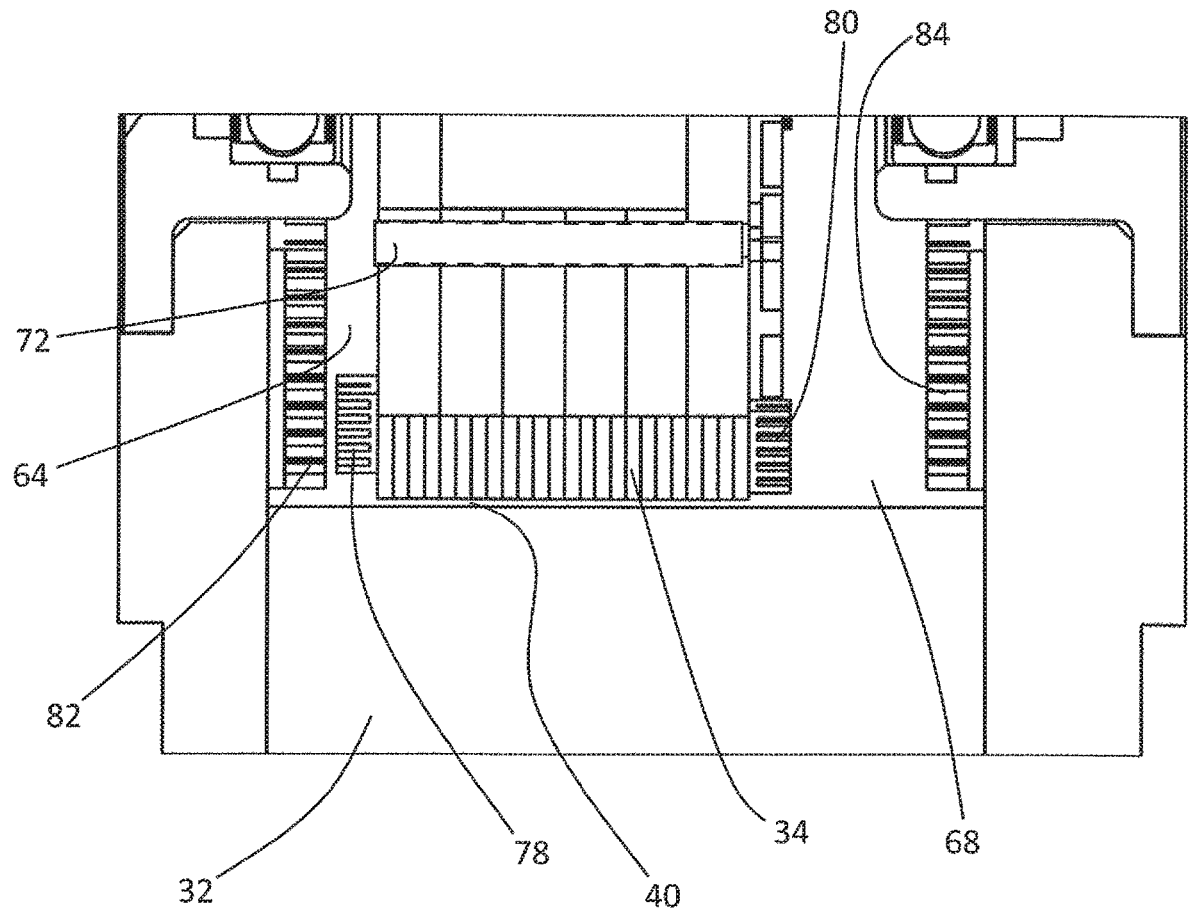
FIG. 9 is an enlarged view of a portion of the motor of FIG. 8 showing a forced fluid circuit.

FIG. 8 is a side elevation cross-sectional view of the motor 10 shown in FIG. 2. FIG. 9 is an enlarged view of a portion of the rotor 16, housing 12, and stator 32 shown in FIG. 8. During operation, the rotor 16 must be permitted to spin freely within the stator 32 and housing 12. Thus, the rotor 16, stator 32, and housing 12 collectively define certain cavities within which the rotor 16 operates. For example, the housing 12 of FIGS. 1-2 and 8-9 includes a perimeter portion 54 surrounding the stator 32, and therefore surrounding the shaft axis 22. The perimeter portion 54 of the housing 12 is substantially closed, except for one or more sealed shaft openings, by a first end plate 56 and an opposing end plate 58 at each end of the perimeter portion 54. Thus, the perimeter portion 54, first end plate 56 and opposing end plate 58 define the overall pancake shape of the motor 10. The perimeter portion 54, first end plate 56, and second and plate 58 may be separate structures that are bonded together to form a housing 12. Alternatively, the perimeter portion 54 and one end plate 56, 58 or other housing structures may be cast, machined or otherwise formed as a single part, with the perimeter portion 54 and end plate 56 or 58 serving to identify different regions of a single housing structure.

Figure 10:
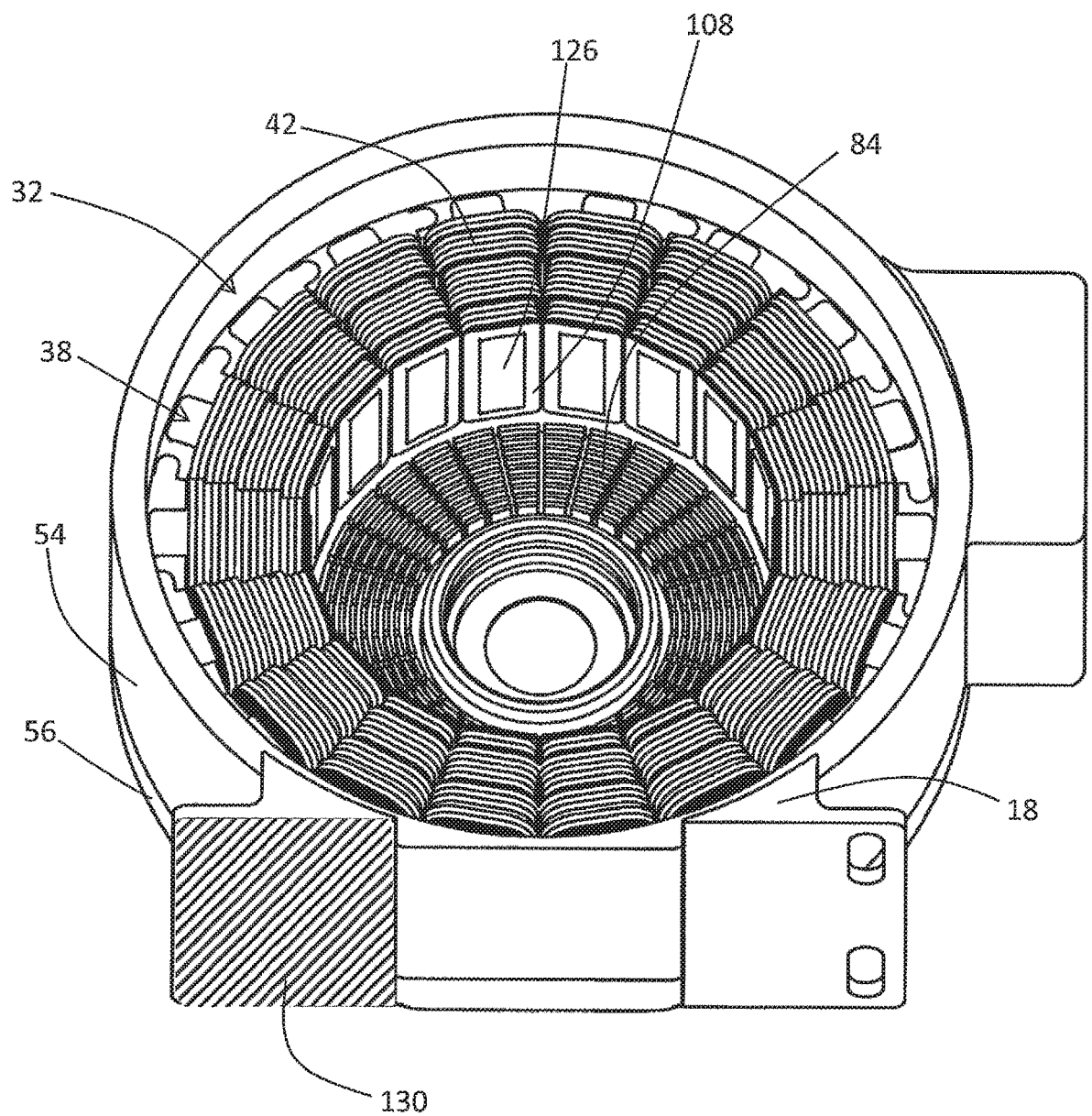
FIG. 10 is an isometric view of portions of the housing and stator of the motor of FIG. 1.
Figure 11:
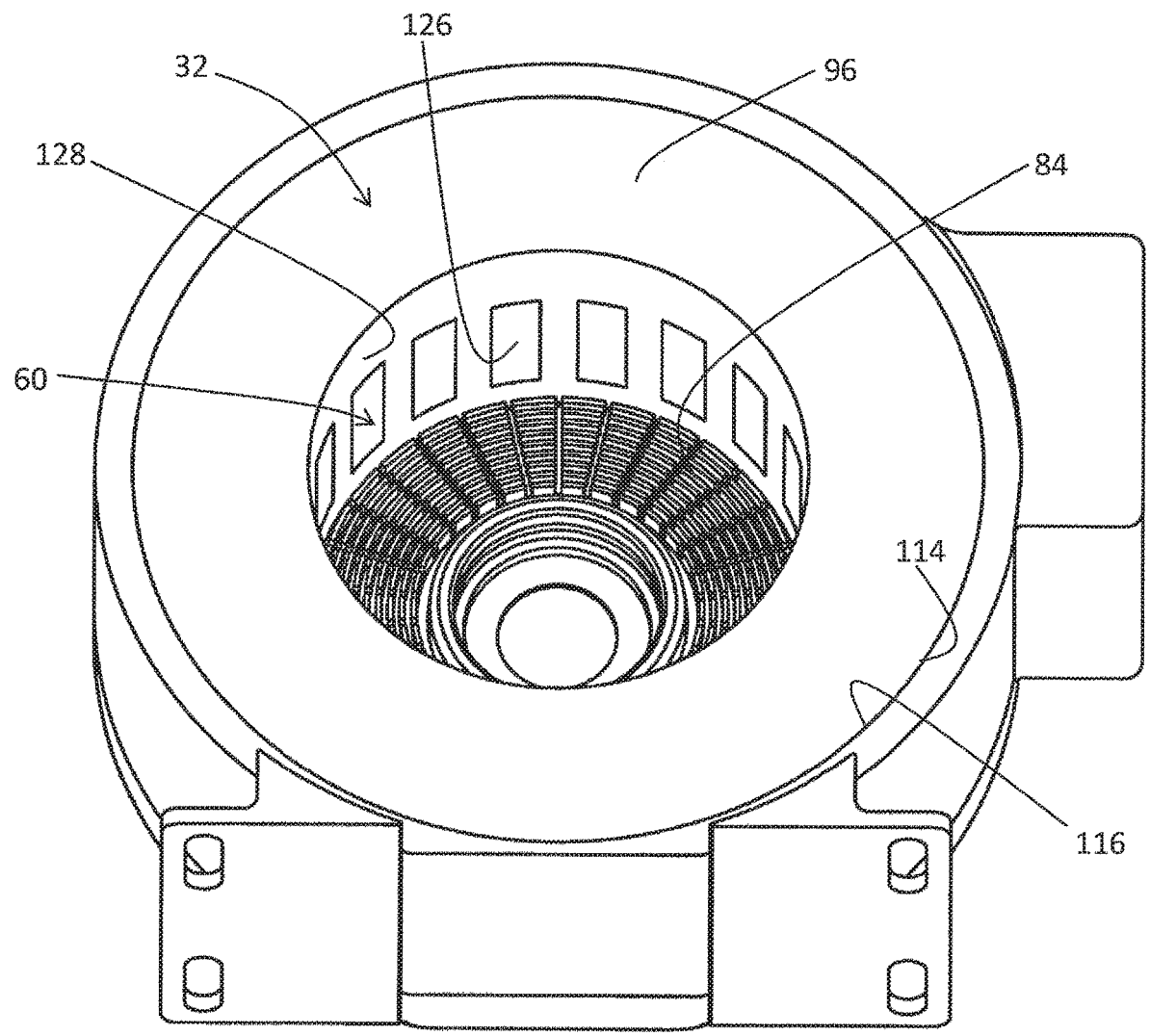
FIG. 11 is an isometric view of portions of the housing and stator of the motor of FIG. 1 showing a stator encapsulant.

Is best viewed in FIGS. 10 and 11, portions of the stator 32 facing the air gap 40 and the end plates 56, 58 define a substantially cylindrical rotor cavity 60. Certain embodiments of the motor 10 include apparatus designed to force air circulation between various distinct regions of the overall cylindrical rotor cavity 60 as described below.

Specifically, an open space between one end 62 of the rotor 16 and adjacent portions of the housing 12 defines a substantially annular first cavity 64 within the cylindrical rotor cavity 60. Similarly, the open space between the opposite end 66 of the rotor 16 and adjacent portions of the housing 12 defines a substantially annular second cavity 68 within the cylindrical rotor cavity 60. Furthermore, the relatively thin air gap 40 extends between the outer perimeter of the rotor 16 and the inwardly facing surfaces of the stator 32 to complete the cylindrical rotor cavity 60. As best shown in FIGS. 2 and 4, air, an air/oil mixture, another gas, liquid, or a mixed fluid may be caused to circulate from one of the cavities 64, 68 to the other cavity 64, 68 and through the air gap 40 by providing the rotor 16 with an internal fan surface such as internal fan 70, and one or more ventilation channels 72 through the stator 32.

Specifically, a series of ventilation channels 72 can be provided through the rotor back assembly 36 as best illustrated in FIG. 3 and FIG. 4. In the illustrated embodiment, each ventilation channel 72 defines a portion of an arc around the shaft axis 22, and constitutes an opening extending through each lamination 50 of the rotor back assembly 36. Other shapes and configurations of ventilation channel 72 are within the scope of this disclosure, provided each ventilation channel 72 has an opening in fluid communication with the first cavity 64 and the second cavity 68.

The first cavity 64, second cavity 68, air gap 40, and each ventilation channel 72 together define an internal forced fluid circuit 74 in part surrounding and extending through the rotor 16. Air, another fluid, or as described below, an air and oil mixture may be caused to circulate through the internal forced fluid circuit 74 by the internal fan 70. The fan 70 may be part of, attached to, or driven by the rotor 16 to cause air or another fluid to circulate within the internal forced fluid circuit 74. Specifically, the fan 70 includes a plurality of fan blades 76 configured to cause a relatively low-pressure zone at the air gap 40 and a relatively high-pressure zone toward the shaft 14 at the second cavity 68, when the rotor 16 rotates in a clockwise direction, as viewed in FIG. 4.

This pressure differential causes air or another fluid to circulate from the second cavity 68 through the ventilation channels 72 to the first cavity 64. Simultaneously, air or another fluid, is caused to circulate from the first cavity 64 through the air gap 40 to the second cavity 68, completing the forced fluid circuit 74. A different fan configuration or different rotation direction could cause the air or other fluid to circulate in the opposite direction.

In the embodiment of FIG. 4, the fan 70 extends into the second cavity 68. In alternative embodiments, the fan 70 may extend into the first cavity 64 or separate fans may extend into both cavities 64 and 68. In certain embodiments, the fan 70 and/or fan blades 76 are a separate structure attached to or driven by the rotor 16. In alternative embodiments, the fan 70 may comprise a plurality of fan blades 76 formed into the rotor back assembly 36, formed in a portion of the shaft 14, or otherwise attached to the rotor 16. In any embodiment, the fan 70 causes air or another fluid to circulate around and through the rotor 16 completing the forced fluid circuit 74 as the rotor rotates.

Air or another fluid circulating within the forced fluid circuit 74 is heated by heat generated within the rotor 16 as described above, thus cooling the rotor 16. The heated fluid can transfer said heat to another structure to ultimately cool the motor 10. Various structures facilitating heat transfer from the rotor 16 to the forced fluid circuit 74 and beyond are described below. In addition, various structures associated with the rotor may have surface treatments designed to promote efficient heat transfer from the rotor 16 to the forced fluid circuit 74. For example, any rotor structure, including but not limited to the fan 70, fan blades 76, shaft 14, rotor back assembly 36, retainer band 52, or other structures may be roughened to increase surface area or treated, for example with black anodization, to facilitate heat transfer between the rotor and the forced fluid circuit 74.

Heat transfer from the rotor 16 to the forced fluid circuit 74, or from the forced fluid circuit 74 to other motor structures such as the housing 12, and ultimately away from the motor 10, may be facilitated with supplemental heat transfer structures. For example, as shown in FIG. 5, the rotor back assembly 36 or another rotor structure may be placed into thermal contact with one or more heat transfer structures, for example SE heat transfer structure 78 and OSE heat transfer structure 80 shown in FIGS. 5, 8, and 9. As defined herein, "thermal contact" means contact between two or more structures such that thermal energy may flow from one structure to another structure. Structures in direct thermal contact with each other are also in physical contact with each other. Alternatively, thermal contact may occur through an intermediate material such as a thermal paste. The SE heat transfer structure 78 and OSE heat transfer structure 80 are merely representative examples of any number of types or configurations of heat transfer structure that can be mounted to, formed in, or otherwise thermally contacted with the rotor 12. In each case, a rotor heat transfer structure 78 or 80 contacts the rotor on one side and extends into either the first cavity 64 or the second cavity 68 to facilitate heat transfer between the rotor 16 and the forced fluid circuit 74.

Other heat transfer structures may be bonded to or formed in thermal contact with the housing 12 to facilitate heat transfer from the forced fluid circuit 74 to the housing 12 and subsequently out of the motor 10 through heat radiation, conduction or convection. For example, as shown in FIGS. 2, 8, 9, and 10, one, two, or more heat transfer structures may be mounted to the housing 12 extending into the first cavity 64 or second cavity 68 toward the rotor 12. In the representative, but nonlimiting example shown in the figures, the motor 10 includes an SE housing heat transfer structure 82 and an OSE housing heat transfer structure 84 extending into the first cavity 64 and second cavity 68 respectively. Each of the heat transfer structures 82, 84 is illustrated as being substantially annular, however other shapes and configurations are within the scope of this disclosure.

The SE housing heat transfer structure 82 and OSE housing heat transfer structure 84 are merely representative examples of any number of heat transfer structure types or configurations that can be mounted to, formed in or otherwise thermally contacted with the housing 12. In each case, a housing heat transfer structure 82 or 84 contacts the housing 12 on one side and extends into either the first cavity 64 or the second cavity 68 to facilitate heat transfer from the forced fluid circuit 74 to the housing 12.

In several of the embodiments illustrated in the figures, a heat transfer structure 78, 80, 82, or 84 may be formed having a number of pins, fins, combination pin/fins 86 or other structures designed to increase surface area and turbulence. The pin/fins 86 extend away from the housing 12 or stator 32 and into the adjacent cavity 64 or 68. A heat transfer structure 78, 80, 82, or 84 may be roughened to increase surface area or treated, for example with black anodization to facilitate heat transfer to or from the heat transfer structure and the forced fluid circuit 74. In addition, one or more heat transfer structures 78, 80, 82, or 84 may be fabricated from a material such as copper or aluminum with high thermal conductivity. The heat transfer structures 78, 80, 82, or 84 may be bonded to the adjacent rotor or housing structure using heat transfer paste or another interface facilitating effective heat transfer from the heat transfer structure 78, 80, 82, or 84 to or from the forced fluid circuit 74.

B. Rotor Encapsulation and Stabilization

In certain embodiments, for example as illustrated in FIG. 5, adjacent permanent magnets 34 are separated by a gap 88. Additional heat transfer from the rotor 16 and particularly from the sides of each permanent magnet 34 may be provided by filling all or a portion of the gap 88 with a thermally conductive rotor encapsulant 90. As detailed below, the thermally conductive encapsulant 90 also reduces windage and provides mechanical stability to the rotor 16. Representative examples of thermally conductive rotor encapsulant 90 include, but are not limited to, epoxy, an engineered polymer, polyester, polyurethane, silicone, or another plastic, flowable or formable material suitable for filling the gaps 88. Thermal management may be enhanced by providing an additive to the thermally conductive rotor encapsulant 90 to enhance the thermal conductivity of the encapsulant material above the native thermal conductivity of the encapsulant without modification. Representative additives to enhance thermal conductivity include, but are not limited to suspended particles of boron nitride, silicon carbide, silica, aluminum oxide, aluminum, copper, another metal, another metal oxide, ceramic, graphene and the like. The thermal conductivity of the encapsulant 90 may further be enhanced if the suspended particles are spherical, have radially oriented fibers or have another shape or orientation designed to facilitate thermal conductivity.

Alternatively, a specific portion or region of the thermally conductive rotor encapsulant 90 can be fabricated from a substance having relatively high thermal transmissivity. For example, the gap 88 could be filled with epoxy or another polymer bound within a metal shell 92, for example a copper or aluminum shell, where the shell has higher thermal conductivity than the polymer. In another embodiment, the gap 88 could be filled with epoxy or another polymer surrounding a more thermally conductive core, for example an aluminum or copper core, in contact through the encapsulant with a permanent magnet 34, rotor back assembly 36, and/or the forced fluid circuit 74. In any embodiment, the thermally conductive rotor encapsulant should possess a glass transition temperature and maximum operating temperature that is significantly higher than expected motor operating temperature.

The thermally conductive rotor encapsulant 90 also serves to provide mechanical strength to the rotor 12 and therefore enhance the overall robustness of the motor 10. For example, thermally conductive rotor encapsulant 90 may be contacted with and/or bonded to the rotor back assembly 36 between adjacent permanent magnets 34, to mechanically anchor the permanent magnets 34 and prevent them from slipping circumferentially around the rotor back assembly 36 under heavy load. The bond between the thermally conductive rotor encapsulant 90 and rotor back assembly 36 may be enhanced mechanically by providing the rotor back assembly 36 with slots 94, grooves, keyways, roughened surfaces, holes, projections, or other structures at the interface between the rotor back assembly 36 and the surface of the thermally conductive rotor encapsulant 90.

As best shown in FIGS. 3 and 4, the thermally conductive rotor encapsulant 90 may be contacted at either or both ends with one or more rotor-side supplemental heat transfer structures. The specific embodiment of FIGS. 3 and 4 includes an array of SE heat transfer elements 78 in thermal contact with the thermally conductive rotor encapsulant 90 and extending into the first cavity 64. In addition, the FIG. 3-4 embodiment includes an array of OSE heat transfer elements 80 in thermal contact with the other end of the thermally conductive rotor encapsulant 90 and extending into the second cavity 68.

The heat transfer structures 78 and 80 are merely representative examples of any number of heat transfer structures that can be mounted to, formed in or otherwise thermally contacted with one end or the other of a thermally conductive rotor encapsulant 90. In each case, heat transfer structure 78, 80 extend into either the first cavity 64 or the second cavity 68 to facilitate heat transfer between the rotor 16 and the forced fluid circuit 74.

In an alternative embodiment, one or more of the heat transfer structures 78, 80, 82, or 84 may also be formed to function as the fan 70. For example, the combination pin/fins 86 of the heat transfer structure 78 of FIG. 5 may be angled or otherwise formed to cause a pressure gradient causing fluid circulation through the forced fluid circuit 74.

C. Heat Transfer Oil

In certain embodiments, the efficiency of heat transfer within the motor 10 may be enhanced by utilizing a heat transfer fluid, in combination with or other than air. For example, a quantity of transformer oil or another heat transfer fluid may be added to the first cavity 64 and/or second cavity 68. When the motor is not operated, the oil will pool in the bottom of each cavity 64, 68 and fill, for example, the bottom quadrant of the air gap 40. As the rotor 16 spins, the permanent magnets 34 are sequentially submerged in the oil bath and heat can be drawn from all exposed faces of the permanent magnets 34 and retainer band 52.

As described in detail below, a stator encapsulant may be added between the stator 32 and housing 12, in part to ensure that oil added to an internal cavity 64, 68 must pool in in contact with the rotor 16. See, for example, the stator encapsulant 96 of FIG. 11. Sufficient oil may be added to the cavities 64, 68 to cover the air gap 40 and/or submerge portions of one or more of heat transfer structures 78, 80, 82, 84 or other heat transfer structures. The cavities 64, 68 and air gap 40 are interconnected regions of the rotor cavity 60. Therefore, a heat transfer fluid added to one cavity will flow to others. The quantity of oil or other heat transfer fluid added to cavities 64, 68 may be equal to or less than 50% of the total volume of cavities 64 and 68, equal to or less than 25% of the total volume of cavity 64 and 68, or another suitable volume.

When the rotor 16 spins at relatively higher speeds, the action of the rotor 16 and or the heat transfer structures 78, 80 may cause splashing and misting of the oil or other heat transfer fluid, improving the thermal properties of the forced fluid circuit 74. Any retainer band 52 may be fitted with a perforated coating or thin mesh surface to ensure turbulent flow and low drag as the rotor 16 moves through the oil bath.

D. Rotor Back Assembly Heat Export

As is generally described above, the rotor back assembly 36 conducts heat from the edges of the permanent magnets 34 facing the shaft axis 22, and generates some heat through eddy currents and hysteresis loss within the rotor back assembly 36 itself. The heat conducted to or generated within the rotor back assembly 36 may be conducted radially to ventilation channels 72. Alternatively, heat conducted to or generated within the rotor back assembly 36 may be conducted axially to the SE heat transfer structure 78, the OSE heat transfer structure 80, another heat transfer structure, or the fan 70 where heat can be conveyed to the forced fluid circuit 74. The surfaces of the rotor back assembly 36 facing cavities 64, 68 may be structured, textured, anodized or otherwise treated to enhance the export of heat from the rotor 16 to the forced fluid circuit 74, stator 32, housing 12 or other structure from whence the heat may be dissipated into the environment.

The apparatus and methods disclosed herein, including but not limited to the ventilation channels 72 heat transfer structures 78, 80 and thermally conductive rotor encapsulant 90 assure that the rotor back assembly 36 is relatively cooler than the permanent magnets 34 during motor operation. This temperature gradient causes heat flow from the permanent magnets 34 to the rotor back assembly 36 and out of the motor through the shaft 14, forced fluid circuit 74 and housing 12 or another export path as described herein.

E. Shaft Heat Export

Another path for transmitting heat away from the rotor utilizes the shaft 14. The shaft 14 is firmly connected to the rotor back assembly 36, usually with metal-to-metal contact. Heat from the permanent magnets 34, rotor back assembly 36 or other rotor structures may therefore be conducted to the shaft 14. Heat export through the shaft 14 may be enhanced by providing the shaft 14 with a relatively highly heat-conductive core 98, or other shaft structure, made of a material having relatively high thermal conductivity such as aluminum or copper, when compared to the surrounding steel shaft material. The shaft 14 connects to the body of the equipment being driven, for example, a fan, pump, drive roller, or material processing machine. Thus, the shaft 14, particularly if it is provided with a heat conductive core 98, can conduct heat to the driven machine, where the heat may be dissipated through convection, conduction or radiation.

Stator Cooling Methods and Apparatus

The primary sources of heat generation in the stator 32 are magnetically induced eddy currents within the metal core 44 of the electromagnets 38 and resistance losses in the windings 42. The quantity of heat produced in a stator 32 may be reduced by maximizing the wire gauge of the windings 42 to maximize slot fill and reduce AC resistance losses. In addition, rectangular wire may be utilized for the windings 42 to increase slot fill and reduce resistance losses. Magnetically induced eddy currents within the steel electromagnet cores 44 may be minimized by fabricating each core from electrically isolated laminations as described in detail below.

Several apparatus and methods are disclosed for cooling an electric machine stator and dissipating heat from the machine. It is important to note that the stator 32, particularly in a TENV machine, is entirely enclosed within the machine housing 12. Therefore, cooling the stator 32 often involves heat transfer to another motor structure, for example the housing 12, or shaft 14, prior to heat dissipation from the motor 10. In certain instances, the stator cooling methods and apparatus described herein operate in conjunction with methods and apparatus for cooling other portions of the motor 10, rotor 16 and/or housing 12. The various thermal management methods and apparatus make be combined in any fashion, scaled, or partially implemented to achieve desired thermal management and machine durability goals.

A. Electromagnet Structure

Figure 13:
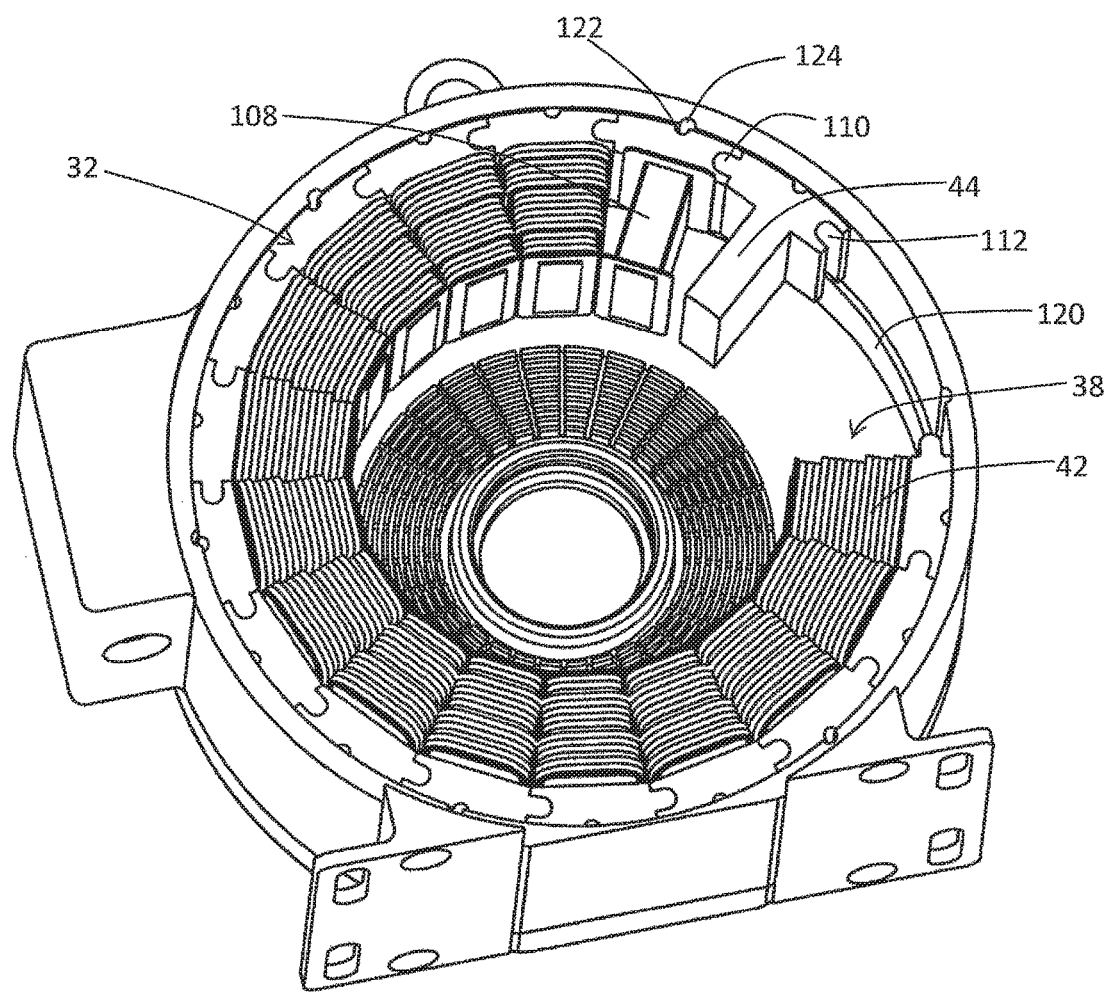
FIG. 13 is an isometric view of portions of the housing and stator of the motor of FIG. 1 with selective electromagnet portions removed.

As shown in FIGS. 10, 13, and 14, a representative electric machine stator 32 includes a plurality of electromagnets 38 radially positioned around the shaft axis of the machine, for example the motor 10. As best viewed in FIG. 14A, and the exploded view of FIG. 14B, the electromagnets 38 include a core 44 of a magnetic metal, typically a steel alloy. Magnetically induced eddy currents can be reduced by fabricating the core 44 from a stack of similarly or identically shaped and relatively thin laminations 46. The specific lamination shape shown in FIG. 15 includes a tooth portion 100 and a yoke segment 102. When multiple laminations 46 are stacked to form an electromagnet core 44 the tooth portions 100 directly or indirectly supports the windings 42 while the yoke segments 102 provide structure to the stator 32, a heat transfer pathway to the exterior of the stator 32, and additional magnetic core mass.

It is necessary to provide electrical insulation between adjacent laminations 46 to reduce magnetically induced eddy currents in the core 44. Therefore, the opposing planar surfaces of each lamination 46 may be coated with a lacquer, epoxy, plastic, insulating paint, paper, or another dielectric layer or coating to provide electrical insulation between adjacent laminations 46 when multiple laminations are stacked to fabricate an electromagnet core 44. Conventional lamination insulating methods tend to also thermally insulate each lamination and restrict the flow of heat generated either within the core 44 or within the surrounding windings 42.

The magnetic steel alloys used for core laminations 46 typically have relatively low thermal conductivity. The thermal performance of an electromagnetic core 44, and thus the thermal performance of an electric machine, may be enhanced by coating or otherwise associating the magnetic steel laminations 46 with a material having relatively higher thermal conductivity than magnet steel. For example, some portion, or the entirety, of the exterior surfaces of a steel lamination 46 may be coated with, plated with, have deposited upon, or otherwise be associated with a relatively thin thermal transmission layer 104 of a metal such as nickel, nickel silver, copper, aluminum, graphene or another material having higher thermal conductivity than the steel lamination interior. An electrical insulation layer 106 may be added over the thermal transmission layer 104 to minimize eddy currents when the laminations 46 are stacked into an operable configuration. In certain embodiments one layer may serve both as an insulator and as a thermal transmission layer, provided the material selected is a dielectric material and has greater thermal conductivity than the magnetic steel used for laminations. For example, various graphene oxides could serve as a single layer providing both enhanced thermal transmission and electrical insulation.

Figure 15A:
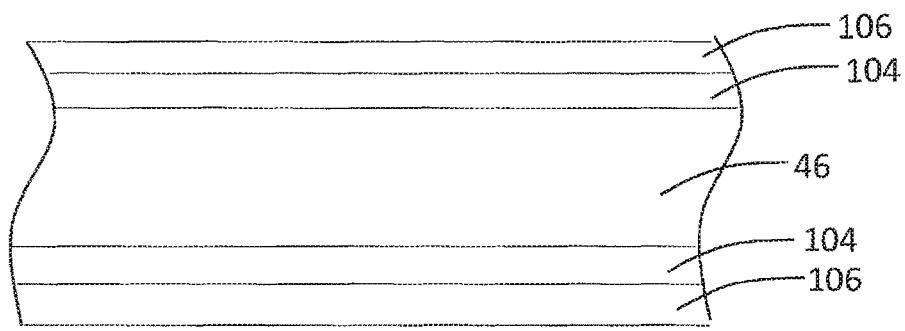
FIG. 15A is a schematic diagram showing a layered EM lamination structure.

One example of a layered lamination configuration having higher thermal conductivity than a simple insulated steel lamination is shown in FIG. 15A. In this embodiment, the steel lamination 46 is coated first with a thermal transmission layer 104 having higher thermal conductivity than the steel of the underlying lamination 46. The thermal transmission layer 104 may then be coated or otherwise associated with a dielectric insulation layer 106.

Figure 15B:
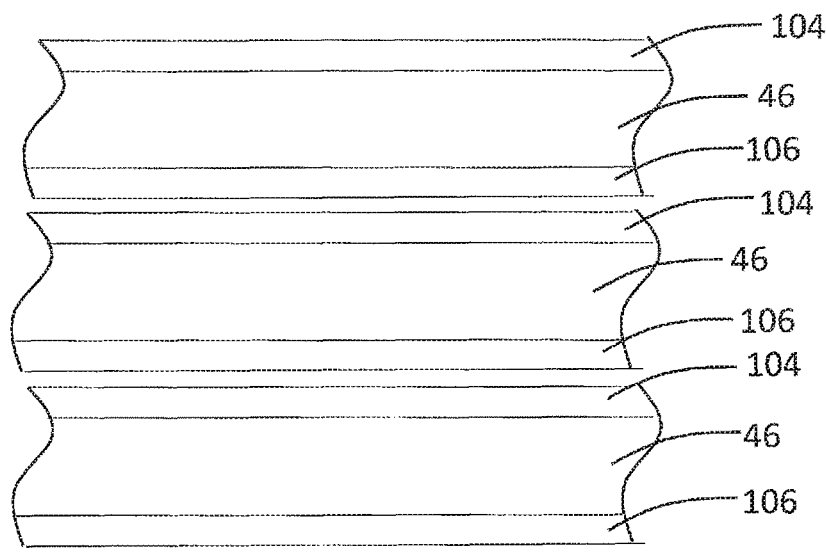
FIG. 15B is a schematic diagram showing an alternative layered EM lamination structure.
Figure 15C:
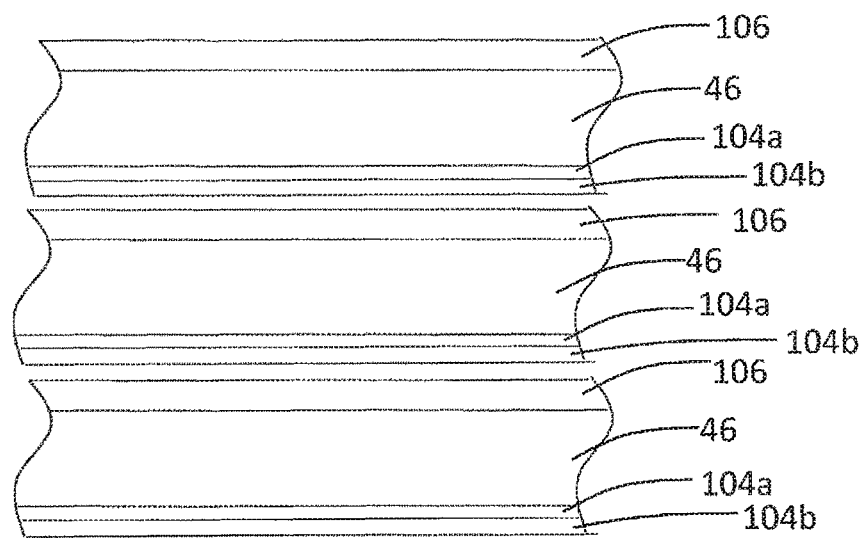
FIG. 15C is a schematic diagram showing an alternative layered EM lamination structure.

Alternatively, as shown in FIG. 15B, only one planar surface of a lamination 46 may be coated with or otherwise insulated with a dielectric insulation layer 106. The opposing planar surface of said lamination 46 may be coated with, contacted with, bonded to, plated with, or otherwise associated with a thermal transmission layer 104 of a material selected to facilitate heat transfer away from the electromagnetic core 44. If a core 44 is fabricated from a plurality of laminations 46, prepared in this fashion, the thermal transmission layer 104 is not required to provide electrical insulation since the dielectric insulation layer 106 of the immediately adjacent lamination 46 will electrically insulate both laminations from each other, provided each lamination is oriented in the same fashion, as shown on FIG. 15B The thermal transmission layer 104 can be, for example, a metal having significantly higher thermal conductivity than steel deposited on the lamination 46. Representative metals having higher thermal conductivity than steel include, but are not limited to, copper, nickel, gold, silver, or aluminum. Other materials, for example graphene or graphing oxide, may be deposited as a thermal transmission layer 104 on a lamination 46. A combination of the above materials may be used. For example, as shown on FIG. 6C, a core 44 may be fabricated with a stack of interior steel laminations 46 having a dielectric coating 106 deposited or otherwise associated with one surface of a steel lamination 46, which is coated on the opposite surface with a metal 104a, for example nickel silver, which is subsequently coated with a graphene layer 104b. As this pattern repeats itself through the stack, each lamination 46 is insulated from adjacent laminations, yet each lamination is also in contact with one or more thermally conductive transmission layers 104 providing for heat export from the core 44.

The stacked laminations 46 forming the electromagnetic core 44 must be held together during assembly and operation and insulated from the windings 42. Conventional electromagnetic cores are often held together by glue, lacquer, screws, bolts, pins, crimped surfaces, other fasteners, welded joints or other means. Insulation may be provided by the glue or lacquer, a supplemental structure such as tape or paper, or merely with the winding insulation. The disclosed embodiments could be implemented with any one of the foregoing assembly and insulation techniques. Alternatively, as shown in FIG. 14, the stack of laminations 46, and any lamination coatings 104, 106 can be tightly compressed together into a core 44 having superior thermal properties with a dielectric bobbin 108 surrounding the top, bottom, and sides of the tooth portion 100 of each lamination 46 in the core 44. The dielectric bobbin 108 may be fabricated, by injection molding for example, from a plastic, nylon or similar material. The utilization of a bobbin 108 as a means of compressing the lamination faces together facilitates the use of thermal transmission layers 104 which might be compromised by the use of alternative lamination attachment methods including but not limited to glue or lacquer between each lamination face, bolts or screws through adjacent laminations, welded joints positioned along one or more sides of the lamination stack, mechanical crimp connections between laminations, notches or other fixturing methods.

Specifically, the bobbin 108 assures constant, evenly distributed pressure across the tooth portion 100 of each lamination 46 in an electromagnetic core 44. Evenly distributed pressure minimizes gaps between laminations 46 or layers 104, 106 and therefore facilitates heat transfer from each lamination 46 to any associated thermal transmission layer 104. In addition, using a bobbin 108 to compress the laminations 46 and associated layers 104, 106 into a core 44 avoids the possibility of a bolt, screw, crimp, weld or other mechanical fastener causing a short circuit between one or more laminations 46 and thereby compromising the electromagnetic properties of the core 44. In certain embodiments, the bobbin 108 is the only structure holding adjacent laminations together.

As also shown in FIG. 14, the bobbin 108 supports the windings 42. Certain portions of the windings 42 extend through the slot between adjacent electromagnetic cores 44. Other portions of the winding 42 are end turns 109 bridging adjacent slots, across each electromagnetic core 44.

As shown in FIG. 14, the yoke segment 102 of each lamination may be formed into opposing male and female dovetail, tongue and groove, or other mating structures, 110 and 112 respectively. Thus, when a series of electromagnets 38 are assembled into a stator, as best shown in FIG. 13, adjacent male and female tongue 110 and groove 112 structures provide mechanical support to the stator 32. Furthermore, the tapered shape of each tooth 100, bobbin 108 and winding 42 create a concentrated winding coil that tapers to the shape of the slot, providing for high slot fills. High slot fill results in a reduction in electrical resistance and hence lower losses and reduced heat production.

B. Stator/Housing Interface

The stacked, outwardly facing surfaces of a plurality of yoke segments 102, defines an exterior surface 114 of the stator 32. As shown in FIG. 13, the exterior stator surface 114 fits closely within the perimeter portion 54 of the housing 12. Heat can flow within each core 44 to the exterior stator surface 114, particularly if thermal transmission layers 104 are provided on or between the laminations 46 as described above. The transfer of heat from the exterior stator surface 114 to the perimeter portion 54 of the housing 12, and subsequently to the outside environment, may be facilitated by providing a thermally conductive lubricant between the exterior stator surface 114 and an interior surface 116 of the perimeter portion 54 of the housing 12. Representative thermally conductive lubricants include but are not limited to thermal grease, graphene, or boron nitride powders.

Figure 12:
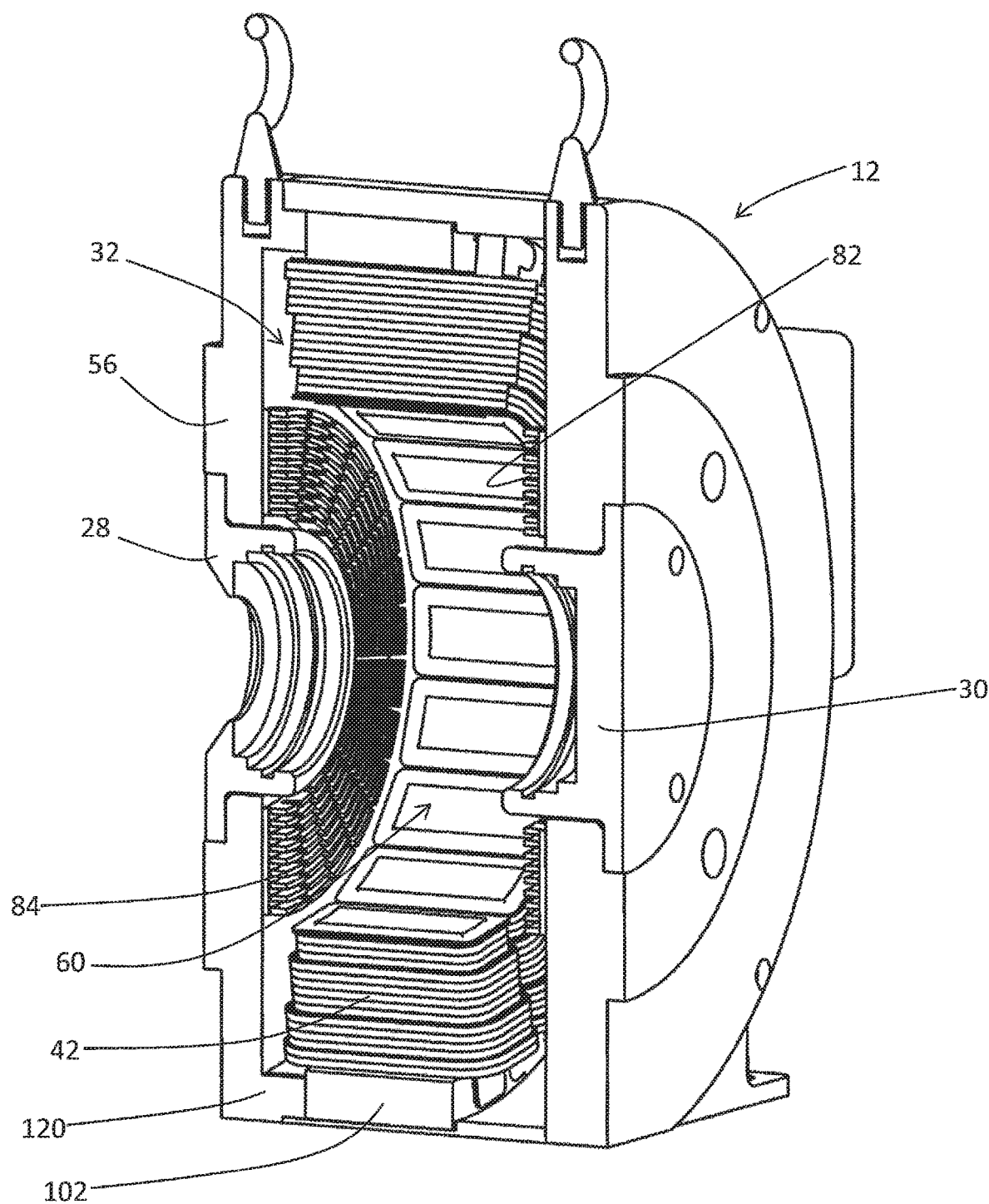
FIG. 12 is an isometric cross-sectional view of the motor of FIG. 1 with the rotor removed.
Figure 16:
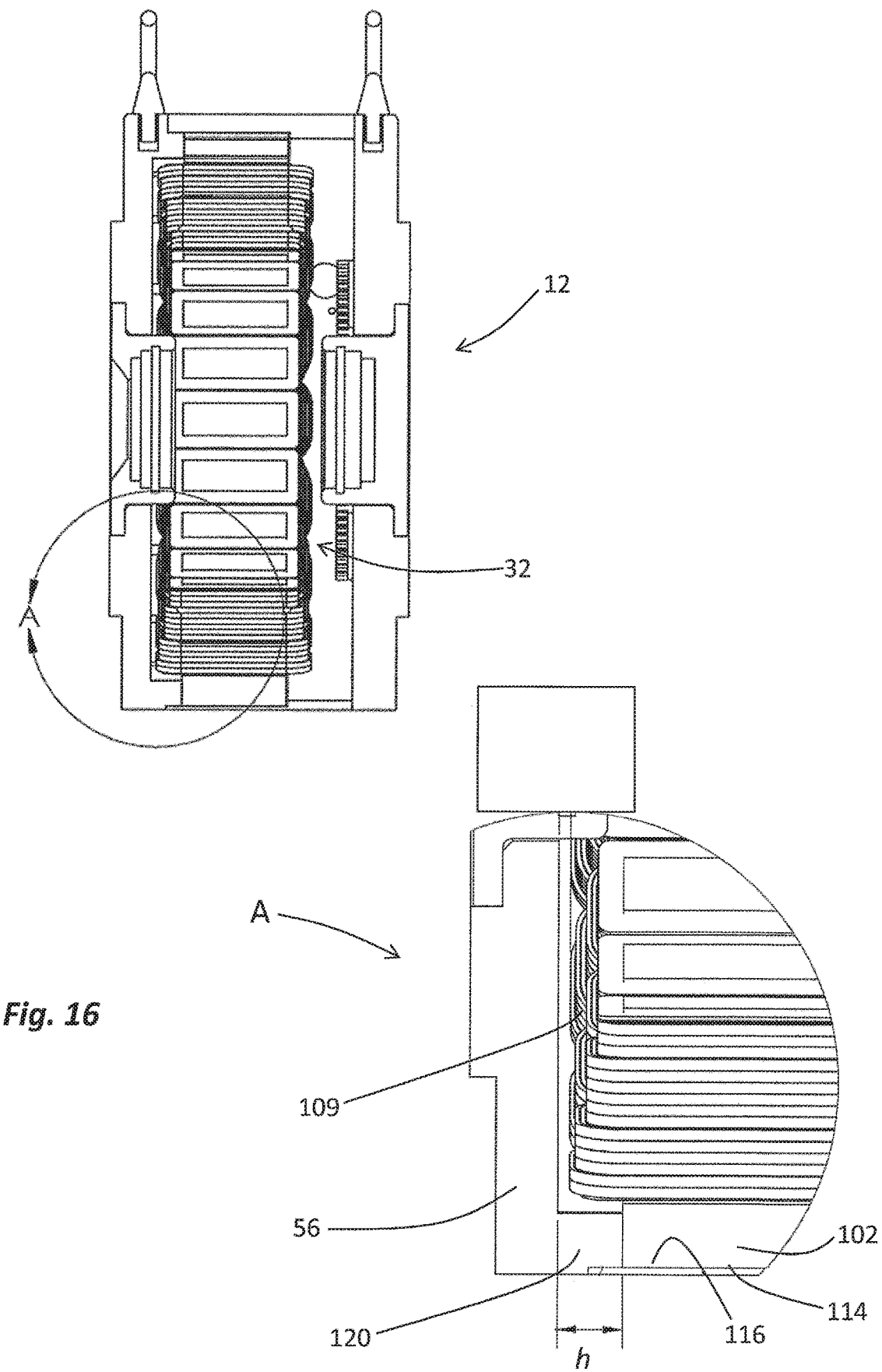
FIG. 16 is a side elevation cross-sectional view of the motor of FIG. 1 showing detail at the interface between the housing and stator.

Overall machine robustness and thermal performance is also further enhanced by carefully coupling the stator 32 to the housing 12. For example, as shown in FIGS. 12, 13 and 16, one or more of the end plates 56, 58 may define a lip and shoulder structure on the end plate 56, 58 that contacts the yoke segment 102. The lip/shoulder structure 120 engages the yoke portion 102 of each electromagnetic core 44 somewhat away from the balance of the end plate 56, 58. Thus, the lip/shoulder structure 120 creates a pocket in the end plate providing clearance for the end turns 109 of windings 42. The height of the lip/shoulder structure 120 (marked as (h) on FIG. 16), may be selected to reduce the distance from the end turns 109 to the end plate 56, 58, facilitating heat transfer. As described in detail below, the remaining gap may be filled with a thermally conductive encapsulant or other structure or material to facilitate heat transfer. In addition, the height h of the lip/shoulder structure 120 can be increased as needed to minimize the formation of magnetically abused any currents in the end plate 56, 58.

Additional machine robustness may be enhanced by providing selected electromagnet cores 44 with an engagement structure 122 at, or in, the exterior surface 114. The housing 12 may include a mating engagement structure 124 opposite the engagement structure 122. The engagement structures 122 and 124 may be any shape or size configured to mechanically mate the exterior surface 114 of the stator 32 with the interior surface 116 of the housing 12, and therefore prevent rotation or other movement of the stator 32 when under load. The specific embodiment of engagement structures 122, 124 illustrated in FIG. 13 includes a rounded slot formed in the electromagnet core 44 and a corresponding rounded slot formed in the perimeter portion 54 of the housing 12. Each slot may be engaged with a pin to meet the stator 32 to the housing 12. Additional robustness is provided by tightly fitting the exterior surface 114 of the stator 32 to the interior surface 116 of the housing 12 to harden the case and protect the electromagnets 38 from impact, vibration, or other forces.

C. Stator Encapsulation and Stabilization

Additional thermal transfer from portions of the stator 32 or other machine structures and enhanced stator robustness may be provided with thermally conductive stator encapsulants, thermal transmission structures, or potting materials. For example, certain embodiments may include a thermally conductive stator encapsulant 96 encapsulating much of the stator structure. In the particular embodiment of FIG. 11, the thermally conductive stator encapsulant 96 encapsulates the entirety of the electromagnet assemblies 38, but for the exterior stator surface 114 and the inside faces 126 of some or all of the magnetic cores 44 facing the air gap. Additionally, the thermally conductive stator encapsulant 96 directly contacts one or both housing end plates 56, 58 or other housing structure, providing a direct thermal pathway from the stator 32 to the housing 12.

Alternative structures may be used in lieu of or in combination with full or partial stator encapsulation. These alternative structures are within the scope of this disclosure. For example, thermal transfer from the stator may be provided by a separate thermal contact structure, for example a thermally conductive, compressible or conformable solid material placed into contact with some portion of the stator 32 and the housing 12, or placed between a portion of the stator encapsulant 96 and the housing 12. A thermal contact structure could be substantially solid, or have a honey-comb structure, wave washer structure, or the like. A thermal contact structure could be fabricated of a thermally conductive felt, foam, metal, coated metal, conformable epoxy, composite, for example a silicon based pad with alumina filler, or any other suitable thermally conductive compound, material, or combination of materials.

In embodiments where gaps between the stator 32 and housing 12 are partially or substantially filled with a stator encapsulant 96, for example, in embodiments where the stator encapsulant 96 substantially fills a perimeter portion of the housing 12, structural benefits beyond thermal management are provided. Encapsulation of the electromagnets 38 in a stator encapsulant 96 physically prevents contamination of the electromagnets 38 by moisture or particulate matter. Such contamination can cause insulation degradation and eventually cause shorts between adjacent wires. Furthermore, a dielectric encapsulant 96 provides increased protection against manufacturing defects in the wire insulation. Thus the encapsulant 96 can provide redundant protection against wire-to-wire shorts, supplementing the insulation on the windings 42. In certain embodiments, the encapsulant 96 also encapsulates the coil phase electrical connections, which gives additional protection against phase-to-phase shorts and manufacturing imperfections in the wire or electrical junctions.

The encapsulant 96 also reduces wire vibration within the stator 32. Vibration can reduce the integrity and life of the windings 42. Therefore, stator encapsulant 96 provides for enhanced thermal management and enhanced machine robustness. Various sensors 85, including without limitation, one or more heat and vibration sensors, may be embedded into the stator encapsulant 96 so that any increase in heat buildup or increase in stator or rotor vibration can be detected. The sensors 85 may be wired, wireless, Internet of Things (IoT), or other varieties of monitoring sensors or sensors of another appropriate type. Monitoring electric machine operation through one or more sensors allows for the remote detection of any deterioration in machine performance, and for preemptive measures to be taken.

In one embodiment, the stator encapsulant 96 includes a relatively rigid exterior portion surrounding the overall stator structure and contacting the housing as described below. As shown in FIG. 10 however, there is relatively little room between the windings 42 of adjacent electromagnets 38, so it can be advantageous to pot interior portions of the stator 32 with a relatively fluid interior potting material. As described in detail below, any type of stator encapsulant 96, having any suitable consistency, can be treated to have enhanced thermal conductivity promoting the export of heat from the stator 32 to the housing 12.

As noted above, the housing of FIGS. 1-2 and 8-13 includes a perimeter portion 54 surrounding the stator 32. Heat transfer from the stator 32 to the housing 12 may be facilitated by physically contacting the stator encapsulant 96 with one or both of the end plates 56 and 58. In the specific embodiment of FIG. 8, the stator encapsulant 96 contacts the entirety of an annular interior surface of each end plate 56 and 58.

The housing 12 might include a separate perimeter portion 54, a separate first end plate 56, and a separate second and plate 58 that are bonded together to form a housing 12. It is important to note however, that the housing could be formed according to alternative methods. For example, in an alternative embodiment the perimeter portion 54 and one end plate 56, 58 may be cast, machined or otherwise formed as a single part. Thus, in some embodiments, an end plate and the perimeter portion may be a unified structure. In such an embodiment, the stator encapsulant 96 may be in direct or indirect thermal contact with an end plate region of the unified housing structure.

In the configuration illustrated in FIG. 11, the stator encapsulant 96 and the inside faces 126 of certain electromagnet cores 44 define a substantially cylindrical interior stator surface 128 facing the air gap 40 with each end of the interior stator surface 128 being bounded by central portions of the first and second end plates 56 and 58. Collectively, the end plates and interior stator surface 128 define a closed cylindrical rotor cavity 60. In certain embodiments, the motor 10 includes minimal voids, not filled with the stator encapsulant 96 between any stator structure and the housing.

Thus, the stator encapsulant 96, along with any thermally conductive lubricant in contact with the exterior surface of the stator 114 and interior surface of the perimeter portion of the housing 116, cause potentially all surfaces of the stator 32, except for the interior stator surface 128 at the air gap 40, to be in direct thermal contact with one or more portions of the housing 12.

The thermal conductivity of the stator encapsulant 96 may be enhanced by including specific materials within the encapsulant matrix. These materials may be included whether the encapsulant is a substantially rigid exterior encapsulant or a relatively fluid interior potting material. For example, the stator encapsulant 96 may be a dielectric material applied in a liquid state to fill substantially all voids outside of the rotor cavity 60. In certain embodiments, material applied as a liquid will fully or partially hardened into a more or less rigid stator encapsulant 96. Representative dielectric materials suitable for thermally enhancing a stator encapsulation material include, but are not limited to suspended particles of boron nitride, silicon carbide, silica, aluminum oxide, aluminum, copper, another metal, another metal oxide, ceramic, graphene and the like. The thermal conductivity of the encapsulant 96 may further be enhanced if the suspended particles are spherical, have radially oriented fibers or have another shape or orientation designed to facilitate thermal conductivity.

Alternatively, in lieu of or in conjunction with the use of suspended particles, larger scaled structures may be associated with the stator encapsulant 96 to enhance encapsulant thermal conductivity. For example, a solid part, such as a metal or ceramic ring, with higher thermal conductivity than the encapsulant, can be embedded in the encapsulant to create a composite body that has higher thermal conductivity than the encapsulant by itself.

As noted above, the rotor-facing electromagnetic core faces 126 and an inside surface of the stator encapsulant 96 are exposed at the air gap 40. These structures along with the end plates 56, 58 define the enclosed rotor cavity 60. Heat transported from the stator 32 to the rotor cavity 60 has not yet been exported from the machine. Furthermore, the machine rotor 16 operates within the rotor cavity 60 adding additional heat to this space. Heat may be transferred from the rotor cavity 60 through the housing end plates 56, 58 to the external environment. Heat transfer from the rotor cavity 60 to the end plates may be facilitated by fabricating or contacting the central region of one or both end plates 56, 58 with one or more heat transfer structures extending into the rotor cavity 60.

For example, as illustrated in FIGS. 2, 8 and 10-13, the central portion of each end plate 56, 58 may be in thermal contact with a heat transfer structure, 82 and 84 respectively. The configuration of heat transfer structures 82 and 84 are representative examples of any number of types or configurations of heat transfer structure that can be mounted to, formed in, or otherwise thermally contacted with an end plate 56, 58. In each case, a heat transfer structure 82 or 84 contacts the end plate on one side and extends into the rotor cavity 60 on the opposite side.

A heat transfer structure 82 or 84 may be formed having a number of pins, fins, combination pin/fins 86 or other structures designed to increase surface area and promote heat transfer. The pin fins 86 extend away from the end plate 56, 58 and into the rotor cavity 60. The interior surface of a heat transfer structure 82 or 84 may also be roughened to increase surface area or treated, for example with black anodization to facilitate heat transfer. In addition, the heat transfer structure 82 or 84 may be fabricated from a material such as copper or aluminum with high thermal conductivity. The heat transfer structure 82 or 84 may be bonded to the end plate 56, 58 or other housing structure using heat transfer paste or another method facilitating effective heat transfer. Each of the heat transfer structures 82, 84 is illustrated as being substantially annular, however other shapes and configurations are within the scope of this disclosure.

Heat Export from the Housing

Thermal export from the housing 12 to the outside environment may be enhanced by providing the housing with feet 18 or another structure facilitating heat transfer from the housing to a building floor, building wall, mounting bracket, machine part, or other external structure to which the motor 10 is attached. Thermal export through the feet 18 may be enhanced by fabricating the feet from a material having high thermal conductivity, for example aluminum, copper, thermally transmissive composites and the like. In addition, the interface 130 between the feet 18 and external structure may be contacted with or coated with a material to enhance the conduction of heat energy from the feet 18 to the external structure. For example, the interface 130 may be coated with a heat transfer paste or other material having higher thermal conductivity than the feet 18, copper for example.

Additional heat export from the housing may be facilitated by providing exterior portions of the housing 12 with fins, pins, or other heat transfer structures. Portions of the housing 12 may be roughened to increase surface area or treated, for example with black anodization or thermally conductive paint to facilitate heat transfer. In addition, the housing 12 may be fabricated from a material such as aluminum with relatively high thermal conductivity.

Heat Export from the Stator Through the Shaft

As noted above, one path for transmitting heat away from the rotor 16 utilizes the shaft 14. In addition, heat conducted from the stator 32 to the housing end plates 54, 56, or other motor structures may be conducted to the shaft 14. Heat export through the shaft 14 may be enhanced by providing the shaft 14 with a thermally conductive core 98, or other shaft structure, made of a material having a relatively high thermal conductivity such as aluminum or copper. The shaft 14 connects to the body of the equipment it is driving, for example, a fan, pump, drive roller, or material processing machine. Thus, the shaft 14, particularly if it is provided with a thermally conductive core 94, can conduct heat to the driven equipment, where the heat may be dissipated through convection, conduction or radiation.

Furthermore, the shaft 14 is supported by bearings 24, 26 supported in bearing flanges 28, 30. Heat transfer from the housing 12 to the shaft 14 may be facilitated by implementing portions of one or more of the bearings 24, 26 and/or bearing flanges 28, 30 with material having relatively high thermal conductivity, for example copper or aluminum. In one specific embodiment, the bearings 24, 26 include bearing seals 132, 134 fabricated from copper to facilitate heat transfer from the housing 12 to the shaft 14. The bearing flange 28, 30 may also be fabricated from copper or another material with relatively high thermal transmissivity. In addition, the thermally conductive core 98 may extend laterally to or near the shaft surface in the region where the shaft 14 contacts bearings 24 and/or 26 or bearing seals 132, 134.

In certain embodiments, the perimeter portion of the housing 54, first and plate 56 and second and plate 58 may be co-fabricated, welded together, or otherwise fabricated to prevent entry into the housing. Therefore, the bearing flanges 28, 30, or another housing structure may support bearings 24, 26 implemented bearing cartridges that are replaceable from outside the housing. Thus, the bearings 24, 26, which are subject to accelerated mechanical wear compared to other moving parts of a motor 10, may be replaced without accessing the interior portions of the housing 12, thus enhancing overall machine robustness.

Methods

Alternative embodiments include, but are not limited to, methods of cooling an electric machine rotor, methods of cooling an electric machine stator, methods of cooling an electric machine, methods of fabricating an electric machine or parts of an electric machine, methods of stabilizing an electric machine, and methods of fabricating an electromagnet for an electric machine. Various methods will be apparent to those of skill in the art based entirely upon the apparatus disclosed herein.

Representative methods include a method of cooling a rotor 16 or cooling an electric machine 10 having a rotor 16 and a stator 32. The method includes causing the rotor 16 to rotate with respect to the stator 32 to drive an internal fan 70. The internal fan 70 causes a fluid, for example air or an air and oil mixture, to be circulated in a fluid circuit 74 between a first cavity 64 and second cavity 68 adjacent the rotor 16 to cool the rotor 16. Heat transferred to the fluid circuit 74 may subsequently be transferred to the machine housing 12 and then transferred from the machine 10.

Another representative embodiment is a method of cooling a stator 32 or electric machine 10 by placing a stator encapsulant 96 into thermal contact with the stator 32 and a machine housing region 12, for example a first end plate 56 or second end plate 58. The thermal conductivity of the stator encapsulant 96 may be enhanced by mixing an additive with the encapsulant 96 to increase thermal conductivity. Thus, heat generated in the stator 32 may be conducted from the stator 32 through the encapsulant 96 to the housing 12.

Another representative embodiment is a method of fabricating a stator 32 or electric machine 10 having a plurality of electromagnets 38 with electromagnet cores 44. A plurality of the electromagnet cores 44 may be formed to include a stack of laminations 46 defining a tooth portion 100 and a yoke segment 102. Each yoke segment may further define a tongue structure 110 and an opposing groove structure 112. The electromagnets 38 may be assembled into a stator 32 by mating the tongue structure 110 and the groove structure 112 of each electromagnet 38 with the corresponding tongue structure 110 and the groove structure 112 of adjacent electromagnets 38. After the electromagnets are thus assembled, the stator 32 may be encapsulated with a thermally conductive encapsulant 96.

Another representative embodiment is a method of stabilizing an electric machine 10. The method includes stabilizing the rotor 16 with a thermally conductive dielectric rotor encapsulant 90 in contact with adjacent permanent magnets 34 and stabilizing the stator 32 with a thermally conductive dielectric stator encapsulant 96 in contact with adjacent electromagnets 38.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. An electromagnet for an electric machine comprising:
    a stack of laminations, with each lamination defining a tooth and a yoke segment;
    an insulating bobbin surrounding a portion of the tooth of each lamination,
        wherein each lamination is held against adjacent laminations by the bobbin;
    electrically conductive windings surrounding a portion of the bobbin; and
    an encapsulant fully encapsulating the bobbin and windings; and wherein the stack of individual laminations comprises;
    a first lamination;
    a second lamination adjacent to the first lamination;
    a first heat transfer layer bonded to a first planar face of the first lamination; and
    a second heat transfer layer bonded to a first planar face of the second lamination.

2. The electromagnet of claim 1 wherein the encapsulant comprises a dielectric material and an additive to increase the thermal conductivity of the encapsulant.

3. The electromagnet of claim 2 wherein the dielectric material comprises a polymer and the additive comprises one or more of boron nitride, silicon carbide, silicon; aluminum powder, copper powder, metal oxide, ceramic, and graphene.

4. The electromagnet of claim 1 wherein the first lamination and the second lamination each further comprises a dielectric layer in physical contact with a second planar face, opposite the heat transfer layer.

5. The electromagnet of claim 1 wherein the yoke segment defines a tongue structure at a first outside edge and wherein the yoke segment defines a groove structure at a second outside edge, opposite the first outside edge.

6. A method of fabricating an electromagnet for an electric machine comprising:
    providing a stack of laminations defining a tooth and a yoke segment;
    placing an insulating bobbin around a portion of the tooth of each lamination, to hold each lamination against adjacent laminations with the bobbin;
    winding an electrically conductive winding around a portion of the bobbin;
    fully encapsulating the bobbin and windings, wherein the encapsulant comprises a dielectric material and an additive to increase the thermal conductivity of the encapsulant;
    providing first and second individual laminations that are adjacent to each other; and
    bonding a heat transfer layer to a first planar face of each of the first and second individual laminations.

7. The method of claim 6 wherein the dielectric material comprises a polymer and the additive comprises one or more of boron nitride, silicon carbide, silicon; aluminum powder, copper powder, metal oxide, ceramic, and graphene.

8. The method of claim 6 further comprising providing each of the first and second laminations with a dielectric layer in physical contact with a second planar face, opposite the heat transfer layer.

9. The method of claim 6 further comprising providing the yoke segment with a tongue structure at a first outside edge.

10. The method of claim 9 further comprising providing the yoke segment with a groove structure at a second outside edge, opposite the first outside edge.

* * * * *